(12) United States Patent
Zhou et al.

(10) Patent No.: US 11,743,066 B2
(45) Date of Patent: Aug. 29, 2023

(54) REACHABILITY VERIFICATION METHOD AND APPARATUS

(71) Applicant: Huawei Technologies Co., Ltd., Shenzhen (CN)

(72) Inventors: Jigang Zhou, Dongguan (CN); Yufei Wang, Shenzhen (CN); Hongjian Cai, Dongguan (CN); Lulin Wang, Shenzhen (CN); Zhongzhe Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/494,931

(22) Filed: Oct. 6, 2021

(65) Prior Publication Data

US 2022/0029844 A1 Jan. 27, 2022

Related U.S. Application Data

(63) Continuation of application No. PCT/CN2020/081794, filed on Mar. 27, 2020.

(30) Foreign Application Priority Data

Apr. 11, 2019 (CN) .......................... 201910289461.8

(51) Int. Cl.
*H04L 12/18* (2006.01)
*H04L 12/26* (2006.01)
(Continued)

(52) U.S. Cl.
CPC ...... *H04L 12/1863* (2013.01); *H04L 43/0811* (2013.01); *H04L 45/02* (2013.01)

(58) Field of Classification Search
CPC ... H04L 12/1863; H04L 43/0811; H04L 45/02
See application file for complete search history.

(56) References Cited

U.S. PATENT DOCUMENTS 9,225,601 B2  12/2015  Khurshid et al.
9,300,582 B2   3/2016  Grover et al.
(Continued)

FOREIGN PATENT DOCUMENTS

CN      1708962 A   12/2005
CN    103532818 A    1/2014
(Continued)

*Primary Examiner* — Christopher B Robinson
(74) *Attorney, Agent, or Firm* — Slater Matsil, LLP

(57) ABSTRACT

A method performed by a control device includes: receiving forwarding information of many network devices in a network, where the many network devices in the network include a first edge device and a second edge device; determining, based on the forwarding information of the second edge device, information about a first network address that is reachable to the second edge device and that is outside the network; and estimating, based on the first network address information and the forwarding information of the plurality of network devices, whether one or more packets whose destination addresses are covered by the first network address information and that enter the network through the first edge device can be forwarded to the second edge device through the network.

19 Claims, 13 Drawing Sheets

(51) Int. Cl.
*H04L 12/751* (2013.01)
*H04L 43/0811* (2022.01)
*H04L 45/02* (2022.01)

(56) References Cited

U.S. PATENT DOCUMENTS

| | | | |
|---|---|---|---|
| 11,477,110 B2* | 10/2022 | Liu | H04L 41/40 |
| 2004/0085911 A1 | 5/2004 | Castelino | |
| 2006/0056384 A1 | 3/2006 | Iwshii et al. | |
| 2006/0209682 A1* | 9/2006 | Filsfils | H04L 45/502 |
| | | | 370/219 |
| 2007/0121486 A1* | 5/2007 | Guichard | H04L 45/28 |
| | | | 370/216 |
| 2007/0180104 A1* | 8/2007 | Filsfils | H04L 45/28 |
| | | | 709/227 |
| 2009/0198832 A1* | 8/2009 | Shah | H04L 43/10 |
| | | | 709/239 |
| 2014/0169368 A1 | 6/2014 | Grover et al. | |
| 2014/0369209 A1 | 12/2014 | Khurshid et al. | |
| 2016/0036636 A1* | 2/2016 | Erickson | H04L 41/145 |
| | | | 370/254 |
| 2018/0351845 A1 | 12/2018 | Horn et al. | |
| 2018/0367391 A1 | 12/2018 | Harneja et al. | |
| 2020/0007569 A1* | 1/2020 | Dodge | H04L 41/0866 |

FOREIGN PATENT DOCUMENTS

| | | |
|---|---|---|
| CN | 103546374 A | 1/2014 |
| CN | 104301186 A | 1/2015 |
| CN | 105634839 A | 6/2016 |
| CN | 106549825 A | 3/2017 |
| CN | 106789629 A | 5/2017 |
| CN | 106878106 A | 6/2017 |
| EP | 3110086 A1 | 12/2016 |
| WO | 2015023344 A2 | 2/2015 |
| WO | 2015157096 A1 | 10/2015 |

* cited by examiner

| Forwarding information of a network device A | |
|---|---|
| Destination IP address | Output interface |
| 5.0.0.0/8 | A-1 |
| 6.0.0.0/8 | A-2 |
| 7.0.0.0/8 | A-2 |
| 8.0.0.0/8 | A-2 |
| 9.0.0.0/8 | A-3 |
| 10.0.0.0/8 | A-3 |

| Forwarding information of a network device B | |
|---|---|
| Destination IP address | Output interface |
| 5.0.0.0/8 | B-2 |
| 6.0.0.0/8 | B-1 |
| 7.0.0.0/8 | B-3 |
| 8.0.0.0/8 | B-3 |
| 9.0.0.0/8 | B-2 |
| 10.0.0.0/8 | B-2 |

| Forwarding information of a network device C | |
|---|---|
| Destination IP address | Output interface |
| 5.0.0.0/8 | C-3 |
| 6.0.0.0/8 | C-2 |
| 7.0.0.0/8 | C-2 |
| 8.0.0.0/8 | C-2 |
| 9.0.0.0/8 | C-3 |
| 10.0.0.0/8 | C-1 |

| Forwarding information of a network device D | |
|---|---|
| Destination IP address | Output interface |
| 5.0.0.0/8 | D-2 |
| 6.0.0.0/8 | D-3 |
| 7.0.0.0/8 | D-3 |
| 8.0.0.0/8 | D-1 |
| 9.0.0.0/8 | D-2 |
| 10.0.0.0/8 | D-2 |

| Forwarding information of a network device E | |
|---|---|
| Destination IP address | Output interface |
| 5.0.0.0/8 | E-1 |
| 6.0.0.0/8 | E-1 |
| 7.0.0.0/8 | E-2 |
| 8.0.0.0/8 | E-3 |
| 9.0.0.0/8 | E-4 |
| 10.0.0.0/8 | E-3 |

| Forwarding information of a network device F | |
|---|---|
| Destination IP address | Output interface |
| 5.0.0.0/8 | F-1 |
| 6.0.0.0/8 | F-1 |
| 7.0.0.0/8 | F-4 |
| 8.0.0.0/8 | F-3 |
| 9.0.0.0/8 | F-2 |
| 10.0.0.0/8 | F-3 |

FIG. 2

CONT.
FROM
FIG. 8A $HS_{InA1}$={00000110000000000000000000000000, 00000110000000000000000000000001,
..., 00000101011111111111111111111111}

$HS_{InA2}$=$HS_{InB2}$={00000110000000000000000000000000, 00000110000000000000000000000001,
..., 00000100011111111111111111111111}

$HS_{InA3}$=$HS_{InE1}$={00000100100000000000000000000000, 00000100100000000000000000000001,
..., 00000101011111111111111111111111}

$HS_{InB1}$={00000110000000000000000000000000, 00000110000000000000000000000001,
..., 00000110111111111111111111111111}

$HS_{InB3}$=$HS_{InF1}$={00000111000000000000000000000000, 00000111000000000000000000000001,
..., 00000100011111111111111111111111}

$HS_{InE4}$={00000100100000000000000000000000, 00000100100000000000000000000001,
..., 00000100111111111111111111111111}

$HS_{InE3}$=$HS_{InC3}$={00000101000000000000000000000000, 00000101000000000000000000000001,
..., 00000101011111111111111111111111}

$HS_{InF4}$={00000111000000000000000000000000, 00000111000000000000000000000001,
..., 00000111111111111111111111111111}

$HS_{InF3}$=$HS_{InD3}$={00000100000000000000000000000000, 00000101000000000000000000000001,
..., 00000100011111111111111111111111}

$HS_{InC1}$={00000101000000000000000000000000, 00000101000000000000000000000001,
..., 00000101011111111111111111111111}

$HS_{InD1}$={00000100000000000000000000000000, 00000100000000000000000000000001,
..., 00000100011111111111111111111111}

FIG. 8B

REACHABILITY VERIFICATION METHOD AND APPARATUS

CROSS-REFERENCE TO RELATED APPLICATIONS

This application is a continuation of International Application No. PCT/CN2020/081794, filed on Mar. 27, 2020, which claims priority to Chinese Patent Application No. 201910289461.8, filed on Apr. 11, 2019. The disclosures of the aforementioned applications are hereby incorporated by reference in their entireties.

TECHNICAL FIELD

This application relates to the field of network security technologies, and in particular, to a reachability verification method and apparatus.

BACKGROUND

With the increase of network protocol patterns and a network protocol quantity and the expansion of a network scale, forwarding a packet in a network becomes more complex. To ensure reliable and efficient network operation, network functions need to be verified. Reachability is used as a primary and basic function indicator of the network. Efficient network reachability verification becomes very important.

It may be understood that, for a to-be-verified network with an inherent topology structure, each network device is configured with a corresponding forwarding table for indicating a correspondence between a destination address and an output interface of the network device. A packet is transmitted in the network based on the current forwarding table. If there is a packet that cannot be transmitted out of the to-be-verified network, it is considered that an error exists in the current forwarding table of the network, and consequently the network is unreachable. If all packets can be transmitted out of the to-be-verified network, it is considered that the current forwarding table of the network is accurate and correct, and it is determined that the network is reachable.

On this basis, how to quickly and effectively verify the reachability of the network is a problem that needs to be urgently resolved at present.

SUMMARY

To resolve the foregoing problem, embodiments of this application provide a reachability verification method and apparatus. In this way, even for a complex to-be-verified network, reachability of a network can be quickly and automatically verified, to ensure time validity of reachability verification and reduce costs of the reachability verification of the network, thereby improving network security and reliability.

According to a first aspect, a reachability verification method is provided. A control device performs reachability verification on forwarding information to be configured for a network. This may be specifically implemented by using the following procedure: First, the control device receives forwarding information of a plurality of network devices in the network. The plurality of network devices in the network include a first edge device and a second edge device. Then, the control device determines, based on the forwarding information of the second edge device, information about a first network address that is reachable to the second edge device and that is outside the network. Finally, the control device may estimate, based on the first network address information and the forwarding information of the plurality of network devices, whether one or more packets whose destination addresses are covered by the first network address information and that enter the network through the first edge device can be forwarded to the second edge device through the network. If the packets can be forwarded to the second edge device, it indicates that a related part of the preconfigured forwarding information from the first edge device to the second edge device is accurate and correct, that is, it may be determined that the second edge device is reachable to the first edge device. On the contrary, if the packets cannot be forwarded to the second edge device, it indicates that an error exists in a related part of the preconfigured forwarding information from the first edge device to the second edge device, that is, it is determined that the second edge device is unreachable to the first edge device.

In this way, reachability between edge devices is estimated based on information about a network address reachable to the edge device. In other words, verification is performed only for the edge devices, thereby greatly reducing a calculation amount and a verification amount of the reachability verification. In addition, a forwarding status of a packet is theoretically estimated to verify whether the packet is forwarded according to an expected plan of the network, thereby implementing automatic reachability verification. Further, in this embodiment of this application, reachability verification can be quickly and effectively performed between all the edge devices in the network by using the foregoing method, to improve efficiency of reachability verification of the network and reduce verification costs, thereby improving network security and reliability.

In the first aspect, the forwarding information of the second edge device may be forwarding information used to indicate the second edge device to forward a packet to the outside of the network, and the first network address information may be determined based on a destination internet protocol IP address in the forwarding information of the second edge device.

In a possible implementation of the first aspect, a specific implementation process in which the control device estimates, based on the first network address information and the forwarding information of the plurality of network devices, whether the one or more packets whose destination addresses are covered by the first network address information and that enter the network through the first edge device can be forwarded to the second edge device through the network may include: First, the control device determines an IP address based on the first network address information. Then, the control device determines, based on the IP address and the forwarding information of the plurality of network devices, an edge device through which a packet that uses the IP address as the destination IP address is forwarded to the outside of the network after entering the network through the first edge device. Finally, the control device analyzes whether the edge device through which the packet is forwarded to the outside of the network is the second edge device. In a case, if the control device estimates, based on the first network address information and the forwarding information of the plurality of network devices, that the one or more packets whose destination addresses are covered by the first network address information and that enter the network through the first edge device can be forwarded to the second edge device through the network, the control device determines that the second edge device is reachable to the first edge device. On the contrary, if the control device estimates, based on the first network address information and the forwarding information of the plurality of network devices, that the one or more packets whose destination addresses are covered by the first network address information and that enter the network through the first edge device cannot be forwarded to the second edge device through the network, the control device determines that the second edge device is unreachable to the first edge device. In this way, it may be estimated whether the one or more packets whose destination addresses are covered by the first network address information and that enter the network through the first edge device can be forwarded to the second edge device through the network, to determine whether the second edge device is reachable to the first edge device.

In another possible implementation of the first aspect, if the plurality of network devices further include a third edge device, the method provided in this embodiment of this application may further include: The control device determines, based on the forwarding information of the third edge device, information about a second network address that is reachable to the third edge device and that is outside the network. The control device estimates, based on the second network address information and the forwarding information of the plurality of network devices, whether a plurality of packets whose destination addresses are covered by the second network address information and that enter the network through the first edge device can be forwarded to the third edge device through the network. In this way, reachability of the first edge device to a plurality of other edge devices can be verified in this embodiment, thereby improving efficiency of the reachability verification.

In still another possible implementation of the first aspect, to verify the reachability of the entire network, this embodiment may further include: If reachability is implemented between all the edge devices in the network, the control device determines that the network is reachable. If reachability is not implemented between at least one pair of edge devices in the network, the control device determines that the network is unreachable. In some cases, when the control device determines that the network is unreachable, the control device may further locate a root cause for the unreachability. To be specific, this embodiment may further include: The control device determines that a fifth edge device is unreachable to a fourth edge device in the network. The control device locates incorrect forwarding information from corresponding forwarding information from the fourth edge device to the fifth edge device. In this way, reachability verification can be quickly and effectively performed on the entire network, to ensure that the forwarding information configured in the network is accurate and correct, thereby improving network operation security and reliability.

According to a second aspect, a reachability verification control apparatus is further provided, including: a receiving unit, configured to receive forwarding information of a plurality of network devices in a network, where the plurality of network devices include a first edge device and a second edge device; a first determining unit, configured to determine, based on the forwarding information of the second edge device, information about a first network address that is reachable to the second edge device and that is outside the network; and a first estimation unit, configured to estimate, based on the first network address information and the forwarding information of the plurality of network devices, whether one or more packets whose destination addresses are covered by the first network address information and that enter the network through the first edge device can be forwarded to the second edge device through the network. The forwarding information of the second edge device is forwarding information used to indicate the second edge device to forward a packet to the outside of the network, and the first network address information is determined based on a destination internet protocol IP address in the forwarding information of the second edge device.

In a possible implementation of the second aspect, the first estimation unit may specifically include: a first determining subunit, configured to determine an IP address based on the first network address information; a second determining subunit, configured to determine, based on the IP address and the forwarding information of the plurality of network devices, an edge device through which a packet that uses the IP address as the destination IP address is forwarded to the outside of the network after entering the network through the first edge device; and an analysis subunit, configured to analyze whether the edge device through which the packet is forwarded to the outside of the network is the second edge device.

In another possible implementation of the second aspect, if the plurality of network devices further include a third edge device, the apparatus further includes: a second determining unit, configured to determine, based on the forwarding information of the third edge device, information about a second network address that is reachable to the third edge device and that is outside the network; and a second estimation unit, configured to estimate, based on the second network address information and the forwarding information of the plurality of network devices, whether a plurality of packets whose destination addresses are covered by the second network address information and that enter the network through the first edge device can be forwarded to the third edge device through the network.

In still another possible implementation of the second aspect, the apparatus may further include: a third determining unit, configured to: if it is estimated based on the first network address information and the forwarding information of the plurality of network devices that the one or more packets whose destination addresses are covered by the first network address information and that enter the network through the first edge device can be forwarded to the second edge device through the network, determine that the second edge device is reachable to the first edge device; and a fourth determining unit, configured to: if it is estimated based on the first network address information and the forwarding information of the plurality of network devices that the one or more packets whose destination addresses are covered by the first network address information and that enter the network through the first edge device cannot be forwarded to the second edge device through the network, determine that the second edge device is unreachable to the first edge device.

In yet another possible implementation of the second aspect, the apparatus may further include: a fifth determining unit, configured to: if reachability is implemented between all the edge devices in the network, determine that the network is reachable; and a sixth determining unit, configured to: if reachability is not implemented between at least one pair of edge devices in the network, determine that the network is unreachable. In a case, the apparatus further includes: a seventh determining unit, configured to: if it is determined that the network is unreachable, determine that a fifth edge device is unreachable to a fourth edge device in the network; and a locating unit, configured to locate incorrect forwarding information from corresponding forwarding information from the fourth edge device to the fifth edge device.

It should be noted that reference may be made to the descriptions of the method provided in the foregoing first aspect for implementation effects of the apparatus provided in the second aspect in this embodiment of this application. Details are not described herein again.

According to a third aspect, an embodiment of this application provides a reachability verification control device. The device has a function of implementing the foregoing method. The function may be implemented by using hardware, or may be implemented by hardware by executing corresponding software. The hardware or software includes one or more modules corresponding to the foregoing function. In a possible design, a structure of the foregoing device includes a processor and a transceiver. The processor is configured to support the reachability verification control apparatus in implementing a corresponding function in the foregoing method. The transceiver is configured to implement communication between the foregoing reachability verification control apparatus and another device. The reachability verification control device may further include a memory. The memory is configured to be coupled to the processor, and the memory stores a program instruction and data that are necessary for the reachability verification control device.

According to a fourth aspect, an embodiment of this application provides a computer readable storage medium. The computer readable storage medium stores an instruction. When the instruction is run on a computer, the computer is enabled to perform the method in the foregoing first aspect.

According to a fifth aspect, an embodiment of this application provides a computer program product including an instruction. When the instruction is run on a computer, the computer is enabled to perform the method in the foregoing first aspect.

According to a sixth aspect, this application provides a chip system. The chip system includes a processor, configured to support the foregoing apparatus or user equipment in implementing a related function in the foregoing aspects, for example, generating or processing related information in the foregoing method. In a possible design, the chip system further includes a memory. The memory is configured to store a program instruction and data that are necessary for a data sending device. The chip system may include a chip, or may include a chip and another discrete device.

BRIEF DESCRIPTION OF THE DRAWINGS

To describe the technical solutions in the embodiments of this application more clearly, the following briefly describes the accompanying drawings for describing the embodiments. Apparently, the accompanying drawings in the following description show merely some embodiments of this application, and an ordinary person skilled in the art may derive other drawings from these accompanying drawings.

FIG. 2 is a schematic diagram of a forwarding table of a target network show in FIG. 1 according to an embodiment of this application;

FIG. 8A and FIG. 8B are a schematic diagram of a reachability tree corresponding to an example according to an embodiment of this application;

DETAILED DESCRIPTION OF ILLUSTRATIVE EMBODIMENTS

Figure 1:
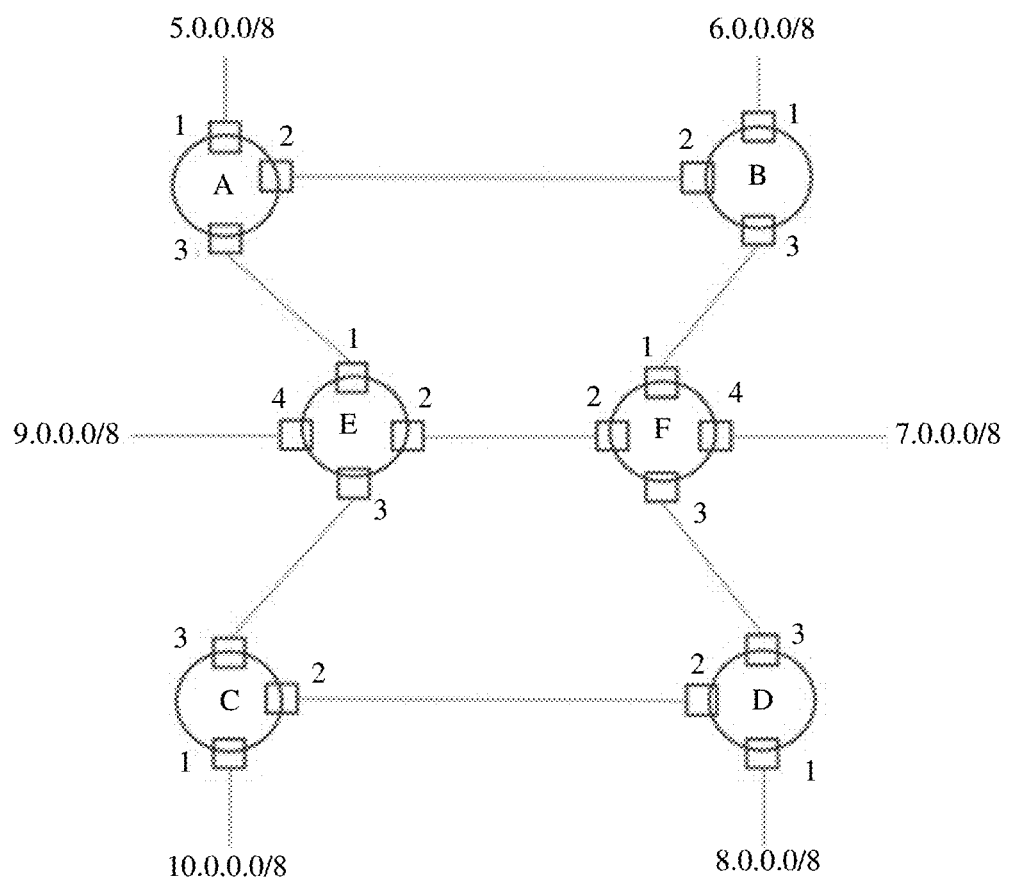
FIG. 1 is a schematic diagram of a network topology in a scenario according to an embodiment of this application.

It may be understood that a network generally includes a plurality of network devices (for example, routers), and each network device includes at least one interface. When a packet reaches an external device (for example, an external terminal or an external network) from another external device through the network, the packet is forwarded between interfaces of the network devices in the network based on a configured forwarding table of the network. In other words, in each network, to implement effective packet forwarding, a forwarding table for indicating packet forwarding needs to be configured. In a specific implementation, each network device in the network corresponds to one forwarding table. Each forwarding table includes a plurality of forwarding entries. Each forwarding entry includes an internet protocol (IP) address of an external device reachable to the network device and an output interface corresponding to the IP address. For example, a network shown in FIG. 1 includes six network devices in total from a node A to a node F. The network device A, the network device B, the network device C, and the network device D each include three interfaces. The network device E and the network device F each include four interfaces. Therefore, based on a network topology shown in FIG. 1, one forwarding table may be separately configured for the six network devices in the network. For example, for details, refer to a schematic diagram of a forwarding table of each network device in the network shown in FIG. 2 in which six forwarding tables are included. The forwarding table of the network device A is used as an example for description. The forwarding table of the network device A includes six forwarding entries, respectively: 5.0.0.0/8 (indicating an IP address of an external device reachable to the network device A) and an A1 interface (indicating an output interface corresponding to the IP address), 6.0.0.0/8 and an A2 interface, 7.0.0.0/8 and the A2 interface, 8.0.0.0/8 and the A2 interface, 9.0.0.0/8 and an A3 interface, and 10.0.0.0/8 and the A3 interface. It should be noted that the forwarding table of the network may be generated based on a used protocol, or be manually configured by technical personnel. The forwarding tables may be uniformly configured at the beginning of network operation. In a network operation process, in order that the network can be more flexibly adapted to a requirement, the forwarding tables may be alternatively newly configured dynamically according to the requirement.

Currently, with the expansion of a network scale and the increase of a network protocol quantity, forwarding a packet in the network becomes more complex. Therefore, correctness of the forwarding table used to ensure effective forwarding of the packet becomes an important factor for ensuring reliable and efficient network operation. For the network that has been configured with the forwarding table, the packet is transmitted in the network based on the configured forwarding table. If the currently used forwarding table is accurate and correct, the packet input to the network can be forwarded to the outside of the network based on a forwarding path in an expected plan, that is, the network is reachable. However, if an error exists in the currently used forwarding table, when the packet input to the network is forwarded in the network, the following case possibly exists: The packet cannot be forwarded based on a forwarding path in an expected plan, and therefore, the packet cannot be correctly forwarded, that is, the network is unreachable.

On this basis, an embodiment of this application provides a reachability verification method, to estimate reachability between edge devices to further quickly determine whether the network is reachable (that is, whether an error exists in the forwarding table of the network). Specifically, reachability verification may be performed on only an edge device in the network (that is, a network device directly connected to an external device). A specific verification method may include: First, a control device receives forwarding information of a plurality of network devices in the network. The plurality of network devices in the network include a first edge device and a second edge device. Then, the control device determines, based on the forwarding information of the second edge device, information about a first network address that is reachable to the second edge device and that is outside the network. Finally, the control device may estimate, based on the first network address information and the forwarding information of the plurality of network devices, whether one or more packets whose destination addresses are covered by the first network address information and that enter the network through the first edge device can be forwarded to the second edge device through the network. The forwarding information of the plurality of network devices may be forwarding information to be configured for the network. If the packets can be forwarded to the second edge device, it indicates that a related part of the preconfigured forwarding information from the first edge device to the second edge device is accurate and correct, that is, it may be determined that the second edge device is reachable to the first edge device. In this case, the forwarding information that is proved to be accurate and correct after the verification may be configured for the operating network. On the contrary, if the packets cannot be forwarded to the second edge device, it indicates that an error exists in a related part of the preconfigured forwarding information from the first edge device to the second edge device, that is, it is determined that the second edge device is unreachable to the first edge device. In this case, new preconfigured reachability forwarding information may be newly generated, or the preconfigured forwarding information may be corrected and then the accurate and correct forwarding information is configured for the operating network.

In this way, in this embodiment of this application, reachability between edge devices is estimated based on information about a network address reachable to the edge device. In other words, verification is performed only for the edge devices, thereby greatly reducing a calculation amount and a verification amount of the reachability verification. In addition, a forwarding status of a packet is theoretically estimated to verify whether the packet is forwarded according to an expected plan of the network, thereby implementing automatic reachability verification. Further, in this embodiment of this application, reachability verification may be quickly and effectively performed between all edge devices in the network by using the foregoing method, to improve efficiency of reachability verification of the network (especially, a large-scale network with a complex structure) and reduce verification costs, thereby improving network security and reliability.

With reference to the accompanying drawings, based on the embodiments, the following describes in detail specific implementations of the reachability verification method in the embodiments of this application.

Figure 3:
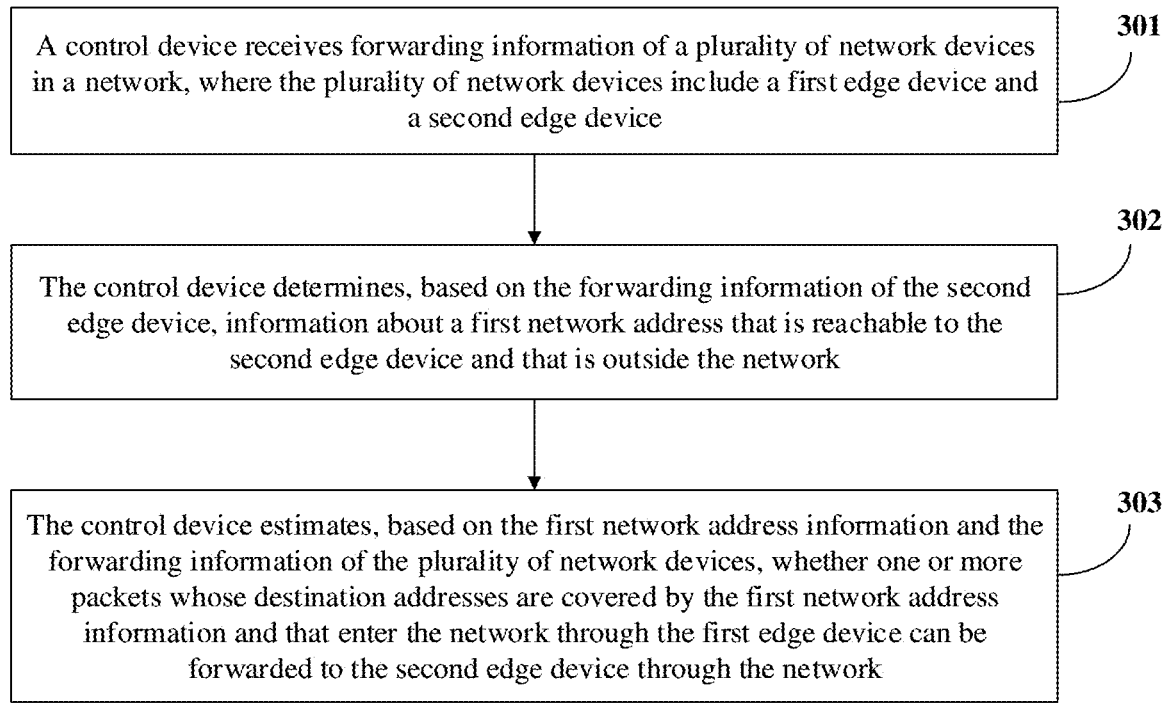
FIG. 3 is a schematic flowchart of a reachability verification method according to an embodiment of this application.

FIG. 3 is a schematic flowchart of a reachability verification method according to an embodiment of this application. The method may specifically include the following step 301 to step 303.

Step 301: A control device receives forwarding information of a plurality of network devices in a network. The plurality of network devices include a first edge device and a second edge device.

It may be understood that each network device in the network includes several interfaces. Based on whether an interface is connected to an external device, interfaces may be classified into two types: an intermediate interface and an end interface. An interface connected to an external device through the network is an end interface, and an interface connected to another internal network device in the network is an intermediate interface. A network device to which the end interface belongs may be denoted as an edge device. For example, for the network topology of the network shown in FIG. 1, 20 interfaces are included. The 20 interfaces include six end interfaces (respectively interfaces A1, B1, C1, D1, E4, and F4) and 14 intermediate interfaces. In this case, six network devices to which the six end interfaces in the network belong are all edge devices.

In specific implementation, during reachability verification of the network, the control device may determine the edge device of the network based on the network topology of the network in a first step, and then receive the forwarding information of the plurality of network devices in the network in a second step.

For the first step, in a case, all interfaces in the target network may be first determined, and then all the interfaces may be traversed to find an interface that is connected to an external device and to determine the interface as an end interface of the network. Network devices to which these end interfaces belong are denoted as edge devices. In another case, all the network devices in the target network may be first determined, and then all the network devices are traversed to find a network device connected to an external device. The network devices are denoted as edge devices of the network. In this embodiment, reachability verification between the two edge devices (that is, the first edge device and the second edge device) in the network is used as an example for description. For reachability verification between other edge devices, a used method is consistent with the method provided in this embodiment.

It should be noted that, in some implementations, for a network with a fixed structure, a network model file of the network may be obtained, for example, a network topology information file, an interface information file of each network device, and a forwarding information file of each network device. In addition, the network topology of the target network may be determined based on the network model file of the network. For example, it is assumed that for the network shown in FIG. 1, the network topology information file may be obtained.

"[{"linkID":"1", "sourceInterfaceId":"2", "sourceNeId": "A", "dstNeId":"B", "outInterfaceId":"2"},
{"linkID":"2", "sourceInterfaceId":"2", "sourceNeId": "D", "dstNeId":"C", "outInterfaceId":"2"},
{"linkID":"3", "sourceInterfaceId":"3", "sourceNeId": "A", "dstNeId":"E", "outInterfaceId":"1"},
{"linkID":"4", "sourceInterfaceId":"3", "sourceNeId": "B", "dstNeId":"F", "outInterfaceId":"1"},
{"linkID":"5", "sourceInterfaceId":"2", "sourceNeId": "E", "dstNeId":"F", "outInterfaceId":"2"},
{"linkID":"6", "sourceInterfaceId":"3", "sourceNeId": "C", "dstNeId":"E", "outInterfaceId":"3"},
{"linkID":"7", "sourceInterfaceId":"3", "sourceNeId": "D", "dstNeId":"F", "outInterfaceId":"3"}]";

An example of the interface information file of each network device is an interface file of the network device A.
"Status":"UP", "Id":"1", "name":"10GE1/0/1", "nodeId":"A", "nodeName":"CE6855-A"
"Status":"UP", "Id":"2", "name":"10GE1/0/2", "nodeId":"A", "nodeName":"CE6855-A"
"Status":"UP", "Id":"3", "name":"10GE1/0/3", "nodeId":"A", "nodeName":"CE6855-A"
"Status":"DOWN", "Id":"4", "name":"10GE1/0/4", "nodeId":"A", "nodeName":"CE6855-A";

An example of the forwarding information file of each network device is a forwarding information file of the network device A.
[{"deviceId":"A", "outInterfaceId":"1", "dstIP":"5.0.0.0/8"},
{"deviceId":"A", "outInterfaceId":"2", "dstIP":"6.0.0.0/8"},
{"deviceId":"A", "outInterfaceId":"2", "dstIP":"7.0.0.0/8"},
{"deviceId":"A", "outInterfaceId":"2", "dstIP":"8.0.0.0/8"},
{"deviceId":"A", "outInterfaceId":"3", "dstIP":"9.0.0.0/8"},
{"deviceId":"A", "outInterfaceId":"3", "dstIP": "10.0.0.0/8"}];

The obtained network topology of the network is shown in FIG. 1. In the foregoing network model file, sourceInterfaceId indicates a source interface, sourceNeId indicates a source network device, dstNeId indicates a destination network device, outInterfaceId indicates an output interface, deviceId indicates a network device, and dstIP indicates a destination IP address. It should be noted that the interface information file of each network device is used to: when the forwarding information file of each network device is incomplete, determine an interface status of each network device to further determine the accurate network topology. For example, it is assumed that the first line is absent from the forwarding information file of the network device A. In this case, the A1 interface may be determined, based on the interface information file of the network device A, as an end interface that is used to connect the network device A in the network to the external device.

It may be understood that the network topology of the network may be determined in the foregoing manner. Therefore, the edge device of the network may be determined. In addition, the first edge device and the second edge device of the network may be determined from the plurality of edge devices. For example, for the network topology shown in FIG. 1, the plurality of network devices in the network may be obtained and include six network devices in total: the network device A to the network device F. It may be determined that the first edge device is any device (for example, the network device A) of the six network devices and that the second edge device is any other edge device other than the first edge device.

It should be noted that the foregoing process of the first step (that is, determining the edge device of the network based on the network topology of the network) may be completed by the control device. Alternatively, another device may determine the edge device in the network, and send the determined edge device to the control device.

In a specific implementation, when the first step of determining the edge device in the network based on the network topology of the network is completed, the second step of receiving the forwarding information of the plurality of network devices in the network may be performed.

The forwarding information of the plurality of network devices may be forwarding information preconfigured for the network in a manner of manually configuring forwarding information or generating forwarding information based on a protocol in advance when the forwarding information needs to be newly configured for the network. It may be understood that the preconfigured forwarding information includes the forwarding information corresponding to each network device, and the forwarding information is used to indicate, to the network device, how to forward a packet in the network. The forwarding information of each network device may be specifically shown in a form of a forwarding information table. For example, it is assumed that the network includes three network devices A, B, and C, the forwarding information includes: a forwarding information table 1 corresponding to the network device A, a forwarding information table 2 corresponding to the network device B, and a forwarding information table 3 corresponding to the network device C. For the forwarding information table, in a case, FIG. 2 shows a preconfigured forwarding table in an instance. The preconfigured forwarding table of each network device includes two entries: a destination IP address and an output interface. In another case, the preconfigured forwarding table of each network device may further include a next-hop network device.

The preconfigured forwarding information is directly configured for an actual network. Once an error exists in the preconfigured forwarding information, a network operation fault such as network unreachability occurs. To avoid the foregoing problem, this embodiment of this application provides the reachability verification method for the preconfigured forwarding information, to quickly and effectively estimate whether the forwarding information that is of the plurality of network devices and that is actually configured for the network can be accurately forwarded to the outside of the network. In this way, it is ensured that the forwarding information is configured for the network, so that the network can reliably and securely operate.

Step 302: The control device determines, based on the forwarding information of the second edge device, information about a first network address that is reachable to the second edge device and that is outside the network.

It may be understood that the control device receives the forwarding information of the plurality of network devices in the network in step 301. The forwarding information includes the forwarding information of the second edge device. The forwarding information of the second edge device is used to indicate the second edge device to forward a packet to the outside of the network. For example, with reference to the forwarding information shown in FIG. 2, it is assumed that the second edge device is the network device C. In this case, the forwarding information of the second edge device is a sixth-line forwarding entry: 10.0.0.0/8 (indicating a destination IP address) and a C1 interface (indicating an output interface).

It may be understood that the control device may determine, based on the forwarding information of the second edge device, the information about the first network address that is reachable to the second edge device and that is outside the network. The first network address information may be specifically determined based on a destination IP address in the forwarding information of the second edge device. It should be noted that each edge device in the network may be connected to one external device, or may be connected to a plurality of external devices. In this case, information about a network address reachable to each edge device may be determined based on a quantity of external devices reachable to the edge device and an IP address of the external device. The network address information may specifically include one or more IP addresses, or may include one or more IP network segments (that is, a prefix of an IP address).

In an example, the first network address information may be an IP address or an IP network segment of an external device that is reachable to the second edge device and that is outside the network. For example, it is assumed that there is an external device O that is reachable to the second edge device and that is outside the network, and an IP address of the external device O is 12.0.0.0/8. In a case, the first network address information corresponding to the second edge device may be 12.0.0.0/8. In another case, the first network address information corresponding to the second edge device may be 12 (that is, an IP network segment corresponding to the IP address 12.0.0.0/8).

In another example, the first network address information may be IP addresses or IP network segments of a plurality of external devices that are reachable to the second edge device and that are outside the network. For example, it is assumed that there are three external devices X, Y, and Z that are reachable to the second edge device and that are outside the network, an IP address of the external device X is 13.0.0.0/8, an IP address of the external device Y is 14.0.0.0/8, and an IP address of the external device Z is 15.0.0.0/8. In a case, the first network address information corresponding to the second edge device may be {13.0.0.0/8, 14.0.0.0/8, 15.0.0.0/8}. In another case, the first network address information corresponding to the second edge device may be {13, 14, 15}.

It may be understood that before estimating whether the second edge device is reachable to the first edge device, the control device performs step 302 to determine the first network address information based on the forwarding information of the second edge device. This provides a data basis for subsequently performing step 303 to verify reachability of the first edge device to the second edge device.

Step 303: The control device estimates, based on the first network address information and the forwarding information of the plurality of network devices, whether one or more packets whose destination addresses are covered by the first network address information and that enter the network through the first edge device can be forwarded to the second edge device through the network.

It may be understood that the one or more packets whose destination addresses are covered by the first network address information indicate a packet that uses, as a destination address, an IP address or an IP network segment that may be included in the first network address information. Because the packet uses the first network address information corresponding to the second edge device as the destination address, theoretically, the packet can be forwarded to the second edge device through the network based on the forwarding information of the plurality of network devices in the network, and then be forwarded from the second edge device to the external device connected to the second edge device.

For example, it is assumed that the first network address information corresponding to the second edge device is 12.0.0.0/8. In this case, a packet 0 whose destination address is 12.0.0.0/8 may be obtained. After the packet 0 enters the network, the packet 0 may be forwarded in the network based on the forwarding information of the plurality of network devices in the network. Theoretically, the packet 0 may reach, through the second edge device, an external device whose IP address is consistent with the destination address 12.0.0.0/8 of the packet 0.

For another example, it is assumed that the first network address information corresponding to the second edge device is 12. A packet 1, a packet 2, and a packet N (N is an integer greater than 2) whose destination addresses all correspond to the IP network segment: 12 may be obtained. After the N packets enter the network, the packets may be forwarded in the network based on the forwarding information of the plurality of network devices in the network. Theoretically, the packets may reach, through the second edge device, an external device whose IP network segment is consistent with an IP network segment corresponding to destination addresses of these packets.

For still another example, it is assumed that the first network address information corresponding to the second edge device is {13.0.0.0/8, 14.0.0.0/8, 15.0.0.0/8}. In this case, a plurality of packets whose destination addresses are 13.0.0.0/8, 14.0.0.0/8, and 15.0.0.0/8 may be separately obtained. After the plurality of packets enter the network, the packets may be forwarded in the network based on the forwarding information of the plurality of network devices in the network. Theoretically, the packets may reach, through the second edge device, external devices whose IP addresses are consistent with the destination addresses of these packets.

In a specific implementation, in step 303, the control device calculates, based on the first network address information and the forwarding information of the plurality of network devices, a forwarding status of the one or more packets whose destination addresses are covered by the first network address information and that enter the network through the first edge device, to estimate whether the one or more packets can be forwarded to the second edge device.

Figure 4:
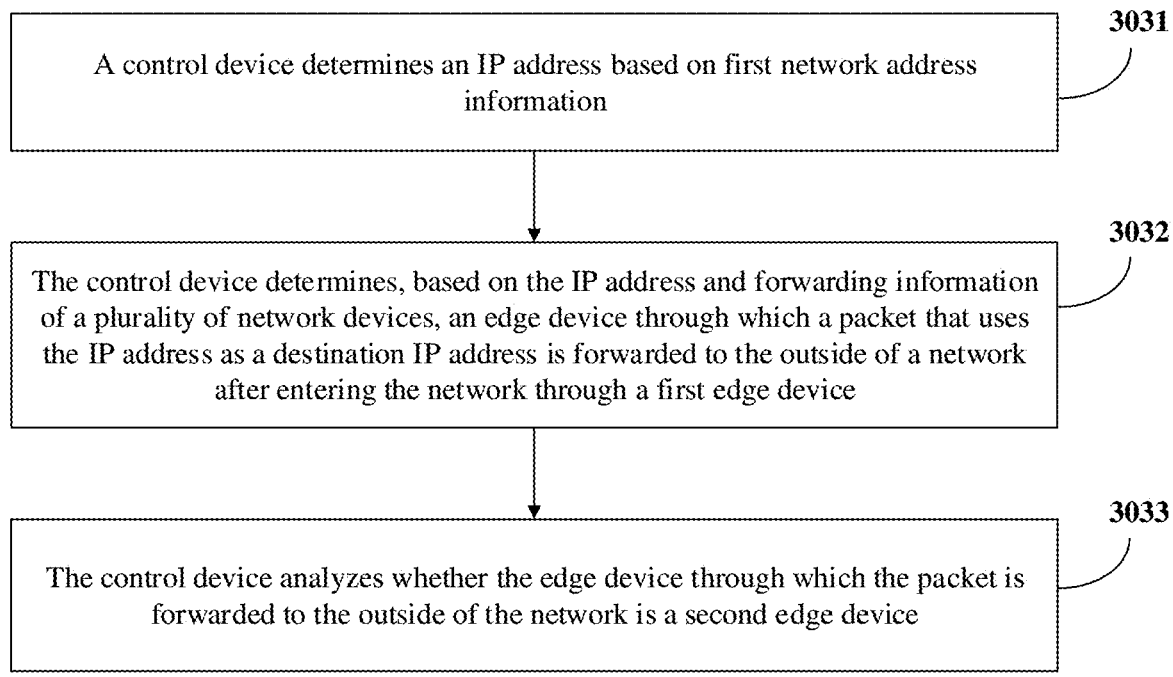
FIG. 4 is a schematic flowchart of an implementation of step 303 according to an embodiment of this application.

In an example, step 303 may be specifically implemented by using the method shown in FIG. 4. With reference to FIG. 4, a specific implementation of step 303 may include the following step 3031 to step 3033.

Step 3031: The control device determines an IP address based on the first network address information.

Step 3032: The control device determines, based on the IP address and the forwarding information of the plurality of network devices, an edge device through which a packet that uses the IP address as a destination IP address is forwarded to the outside of the network after entering the network through the first edge device.

Step 3033: The control device analyzes whether the edge device through which the packet is forwarded to the outside of the network is the second edge device.

For example, it is assumed that the first network address information corresponding to the second edge device D is 8.0.0.0/8. In this case, the control device may determine, based on the first network address information, that an IP address is 8.0.0.0/8. Then, the control device may estimate that a packet whose destination IP address is the IP address (that is, 8.0.0.0/8) is forwarded in the network based on the forwarding information of the plurality of network devices after entering the network through the first edge device A, and then the packet is forwarded to an edge device that is directly connected to an external device and that is in the network. Finally, the control device may analyze whether the edge device is the second edge device D.

It should be noted that, when the first network address information is one or more IP network segments or a plurality of IP addresses, the foregoing step 3031 to step 3033 may be separately performed for each IP address or each possible IP address corresponding to the IP network segment. One or more packets that use each IP address as a destination IP address are used to verify whether the second edge device is reachable to the first edge device.

It may be understood that if the control device estimates in step 303 that the one or more packets whose destination addresses are covered by the first network address information and that enter the network through the first edge device can be forwarded to the second edge device through the network, it may be indicated that a related part from the first edge device to the second edge device in the preconfigured forwarding information of the plurality of network devices is accurate and correct. In this case, the control device may determine that the second edge device is reachable to the first edge device. On the contrary, if the control device estimates in step 303 that the one or more packets whose destination addresses are covered by the first network address information and that enter the network through the first edge device cannot be forwarded to the second edge device through the network, it may be indicated that an error exists in a related part from the first edge device to the second edge device in the preconfigured forwarding information of the plurality of network devices. In other words, it is determined that the second edge device is unreachable to the first edge device.

It should be noted that reachability between other edge devices in the network may also be verified by using the method provided in step 301 to step 303. For a specific implementation, refer to the foregoing implementation and related description of the foregoing reachability verification method between the first edge device and the second edge device. Details are not described herein again.

It may be learned that, in the method provided in this embodiment of this application, the control device may perform reachability verification on the part from the first edge device to the second edge device in the forwarding information to be configured for the network. This may be specifically implemented by using the following procedure: First, the control device receives the forwarding information of the plurality of network devices in the network. The plurality of network devices in the network include the first edge device and the second edge device. Then, the control device determines, based on the forwarding information of the second edge device, the information about the first network address that is reachable to the second edge device and that is outside the network. Finally, the control device may estimate, based on the first network address information and the forwarding information of the plurality of network devices, whether the one or more packets whose destination addresses are covered by the first network address information and that enter the network through the first edge device can be forwarded to the second edge device through the network. If the packets can be forwarded to the second edge device, it indicates that the related part of the preconfigured forwarding information from the first edge device to the second edge device is correct, that is, it may be determined that the second edge device is reachable to the first edge device. On the contrary, if the packets cannot be forwarded to the second edge device, it indicates that an error exists in the related part of the preconfigured forwarding information from the first edge device to the second edge device, that is, it is determined that the second edge device is unreachable to the first edge device.

In this way, reachability between edge devices is estimated based on information about a network address reachable to the edge device. In other words, verification is performed only for the edge devices, thereby greatly reducing a calculation amount and a verification amount of the reachability verification. In addition, a forwarding status of a packet is theoretically estimated to verify whether the packet is forwarded according to an expected plan of the network, thereby implementing automatic reachability verification. Further, in this embodiment of this application, reachability verification can be quickly and effectively performed between all the edge devices in the network by using the foregoing method, to improve efficiency of reachability verification of the network and reduce verification costs, thereby improving network security and reliability.

Figure 5:
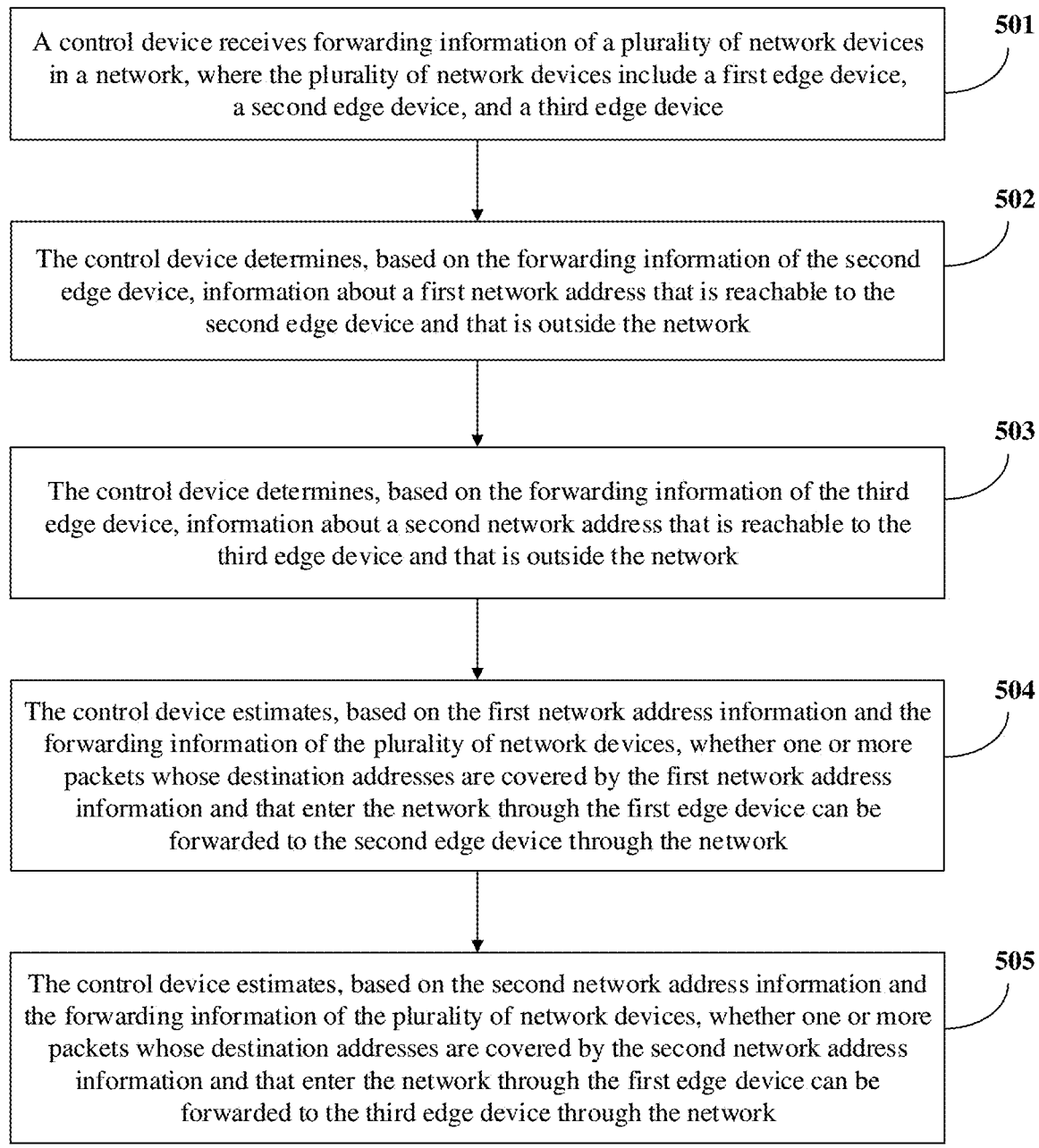
FIG. 5 is a schematic flowchart of another reachability verification method according to an embodiment of this application.

In some other implementations, it is assumed that the plurality of network devices in the network include a first edge device, a second edge device, and a third edge device. The first edge device is an edge device through which a packet enters the network. In this embodiment of this application, reachability from the first edge device to the second edge device and reachability from the first edge device to the third edge device may be simultaneously verified. FIG. 5 is a schematic flowchart of another reachability verification method according to an embodiment of this application. With reference to FIG. 5, this embodiment of this application may specifically include the following step 501 to step 505.

Step 501: A control device receives forwarding information of a plurality of network devices in a network. The plurality of network devices include a first edge device, a second edge device, and a third edge device.

It should be noted that reference may be made to the related description of step 301 for a specific implementation of step 501. Details are not described herein again.

Step 502: The control device determines, based on the forwarding information of the second edge device, information about a first network address that is reachable to the second edge device and that is outside the network.

Step 503: The control device determines, based on the forwarding information of the third edge device, information about a second network address that is reachable to the third edge device and that is outside the network.

It should be noted that reference may be made to the related description of step 302 for specific implementations of step 502 and step 503. Details are not described herein again.

It should be noted that there is no sequence of performing step 502 and step 503. Step 502 and step 503 may be simultaneously performed, or step 502 may be performed before step 503, or step 503 may be performed before step 502.

Step 504: The control device estimates, based on the first network address information and the forwarding information of the plurality of network devices, whether one or more packets whose destination addresses are covered by the first network address information and that enter the network through the first edge device can be forwarded to the second edge device through the network.

Step 505: The control device estimates, based on the second network address information and the forwarding information of the plurality of network devices, whether a plurality of packets whose destination addresses are covered by the second network address information and that enter the network through the first edge device can be forwarded to the third edge device through the network.

It should be noted that reference may be made to the related description of step 303 for specific implementations of step 504 and step 505. Details are not described herein again.

It should be noted that step 504 may be performed at any moment after step 502. It is not limited to perform step 504 after step 503 and before step 505. In addition, step 505 may be alternatively performed at any moment after step 503. It is not limited to perform step 505 after step 504. There is no sequence of performing step 504 and step 505. Step 504 and step 505 may be simultaneously performed, or step 504 may be performed before step 505, or step 505 may be performed before step 504.

It should be noted that, for another edge device in the network except the first edge device, the second edge device, and the third edge device, reachability from the first edge device to the another edge device may be verified according to the foregoing method provided in step 502 (or step 503) and step 504 (or step 505). For a specific implementation, refer to implementations and related descriptions of step 502 (or step 503) and step 504 (or step 505). Details are not described herein again.

It may be learned that, in the method provided in this embodiment of this application, the control device may perform reachability verification on a part about the first edge device in the forwarding information to be configured for the network. Specifically, the control device may estimate, based on the first network address information, the second network address information, and the forwarding information of the plurality of network devices, whether the plurality of packets whose destination addresses are covered by the first network address information and the second network address information and that enter the network through the first edge device can be forwarded to the second edge device and the third edge device through the network. If the packets can be forwarded to the second edge device and the third edge device, it indicates that a related part from the first edge device to the second edge device and a related part from the first edge device to the third edge device in the preconfigured forwarding information is accurate and correct, that is, it may be determined that the second edge device and the third edge device are both reachable to the first edge device. On the contrary, if the packets cannot be forwarded to the second edge device and the third edge device, it indicates that an error exists in a related part from the first edge device to the second edge device and/or the third edge device in the preconfigured forwarding information, that is, it is determined that the second edge device and/or the third edge device are/is unreachable to the first edge device. In this way, reachability between edge devices is estimated based on information about a network address reachable to the edge device. In other words, verification is performed only for the edge devices, thereby greatly reducing a calculation amount and a verification amount of the reachability verification. In addition, a forwarding status of a packet is theoretically estimated to verify whether the packet is forwarded according to an expected plan of the network, thereby implementing automatic reachability verification. Further, in this embodiment of this application, reachability verification may be quickly and effectively performed between all the edge devices in the network by using the foregoing method, to improve efficiency of reachability verification of the network and reduce verification costs, thereby improving network security and reliability.

It should be noted that, when reachability verification is performed based on the preconfigured forwarding information of the plurality of network devices in the foregoing embodiment, reachability verification needs to be successively performed between edge devices in the network. In other words, the control device uses each edge device in the network as the first edge device, uses an edge device other than the first edge device as the second edge device, and separately performs the procedure shown in FIG. 3 once. To show a reachability status of the network, this embodiment of this application further includes: If reachability is implemented between all the edge devices in the network, the control device may determine that the network is reachable. If reachability is not implemented between at least one pair of edge devices in the network, the control device may determine that the network is unreachable.

In a case, if a verification result of reachability verification performed on each pair of edge devices is reachable in a reachability verification process of the network, it may be determined that the network is reachable, and the verification result that the network is reachable is fed back. In this way, the preconfigured forwarding information of the plurality of network devices is configured, in an automatic triggering manner or a manually triggering manner performed by technical personnel, for the actual network as the forwarding information for indicating secure and reliable network operation.

In another case, if a verification result of reachability verification performed on at least one pair of edge devices in a reachability verification process of the network is unreachable, it may be determined that the network is unreachable, and the verification result that the network is unreachable is fed back. In an instance, a specific verification process may be as follows: Once it is found that reachability is not implemented between a pair of edge devices, this time of verification is terminated, and the verification result is fed back to technical personnel to indicate the technical personnel to locate and correct an unreachability cause. After the correction, the reachability verification may be newly performed on each pair of edge devices, or the verification may be performed on the remaining unverified edge devices. In another instance, after the reachability verification is completed on all pairs of edge devices, the verification results may be uniformly fed back to technical personnel, to indicate the technical personnel to locate and correct an unreachability cause for the one or more pairs of unreachable edge devices. After the correction, the verification may end, or reachability verification may be newly performed on each pair of edge devices to improve reliability of the reachability verification. In this way, accuracy of the preconfigured forwarding information of the plurality of network devices can be ensured, to ensure that the forwarding information is configured for the actual network. The network can operate securely and reliably.

To provide a reliable and secure network more quickly, in this embodiment of this application, when the network is unreachable, an error in the forwarding information may be further quickly and accurately located. This may specifically include: The control device determines that a fifth edge device is unreachable to a fourth edge device in the network, so that the control device can locate incorrect forwarding information from corresponding forwarding information from the fourth edge device to the fifth edge device.

It should be noted that if reachability is not implemented between a plurality of pairs of edge devices, incorrect forwarding information causing unreachability between edge devices may be located from the forwarding information corresponding to each pair of edge devices. In a specific implementation, to facilitate the technical personnel to correct the preconfigured forwarding information of the plurality of network devices, or to analyze the incorrect forwarding information, the located incorrect forwarding information may be used as a part of the verification result and fed back to the technical personnel, to indicate to the technical personnel a location at which a problem exists, so that the technical personnel performs the following related operations.

In this way, in the reachability verification method provided in this embodiment of this application, automatic verification is performed between edge devices, to quickly and effectively verify the preconfigured forwarding information of the network. In this way, efficiency of reachability verification of the network is improved, and verification costs are reduced, to ensure accuracy of the forwarding information configured for the actual network and improve network security and reliability.

Figure 6:
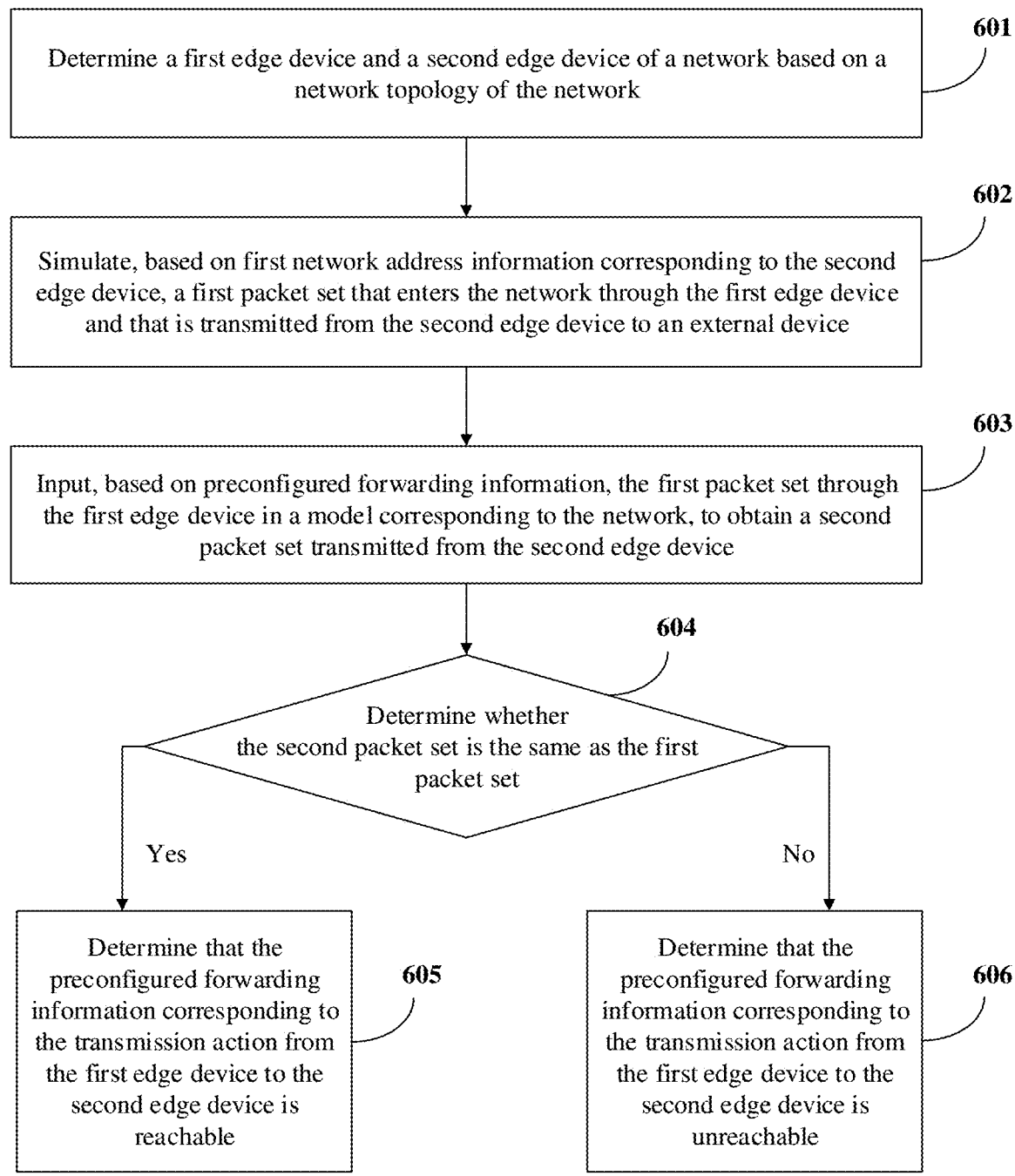
FIG. 6 is a schematic flowchart of another reachability verification method according to an embodiment of this application.

The following describes another reachability verification manner provided in an embodiment of this application. In this embodiment, a packet that may enter a network through a first edge device and that may be transmitted from a second edge device to an external device is screened out in advance based on first network address information of the second edge device, to form a first packet set. Based on the first packet set and a simulated model corresponding to the network, it is verified whether preconfigured forwarding information corresponding to a transmission action from the first edge device to the second edge device in preconfigured forwarding information configured for the network is correct. With reference to FIG. 6, this embodiment may specifically include the following content. Some or all operations in this embodiment may be performed by a control device.

Step 601: Determine a first edge device and a second edge device of a network based on a network topology of the network.

Step 602: Simulate, based on first network address information corresponding to the second edge device, a first packet set that enters the network through the first edge device and that is transmitted from the second edge device to an external device.

The first network address information is information about a network address that is reachable to the second edge device and that is outside the network, and is determined based on forwarding information of the second edge device.

It may be understood that the packet carries a field that affects a transmission action of the packet and uses the field as the first network address information, for example, an IP address of a directly connected external device after the packet is transmitted to the outside of the network. For example, if an IP address of an external device directly connected to an edge device B is 6.0.0.0/8, first network address information corresponding to the edge device B may be 6.0.0.0/8. It should be noted that for each edge device in the network, because external devices connected to edge devices are different, first network address information corresponding to the edge devices is also different. Therefore, simulated packets that can be transmitted from the edge devices to the external devices are also different.

For the determined first edge device and the determined second edge device, in a case, if the second edge device is another edge device that is different from the first edge device, step 302 may specifically include: S11. Determine, based on an IP address (or an IP network segment corresponding to the IP address) of the external device connected to the second edge device, the first network address information corresponding to the second edge device. S12. Simulate, based on the first network address information corresponding to the second edge device, all packets that enter the network through the first edge device and that are transmitted from the second edge device to the external device, to form the first packet set.

For example, it is assumed that the simulated packet is a character string formed by 0 and 1, and the character string is also referred to as a header of the packet. A character string length of the header is equal to a total length of the field that affects the packet transmission action. If only a destination IP address affects the packet transmission action, a character string length of the header=a length of the destination IP address=32, that is, each simulated packet is a 32-bit character string formed by 0 and 1. In this way, the first packet set is a set including a plurality of header. The network shown in FIG. 1 is still used as an example. It is assumed that the first edge device is A and the second edge device is B. In this case, the simulated first packet set that enters the target network through A and that is transmitted from B to the external device may specifically include $FG_{B1}=\{00000110000000000000000000000000,$
$00000110000000000000000000000001,$
$00000110000000000000000000000010, \quad . \quad . \quad . \quad ,$
$00000110111111111111111111111111\}$. There are $2^{24}$ headers in total, that is, $2^{24}$ packets. First eight characters of each header represent a factor that affects the transmission action: an IP network segment 6 corresponding to the destination IP address.

In another case, if the second edge device is a plurality of edge devices that are different from the first edge device, step 602 may specifically include: S21. Determine, based on an IP address (or an IP network segment corresponding to the IP address) of each second edge device, first network address information corresponding to each second edge device. S22. Separately generate, based on the first network address information of each second edge device, a first packet subset that is transmitted from each second edge device to an external device. S23. Calculate a union set of the generated first packet subsets corresponding to the second edge devices, and use the union set as the first packet set of the first edge device.

For example, the target network shown in FIG. 1 is still used as an example. It is assumed that the first edge device is A and the five second edge devices are B, C, D, E, and F. In this case, a simulated first packet subset that enters the target network through A and that is transmitted from B to an external device may specifically include $FG_{B1}=\{00000110000000000000000000000000,$
$00000110000000000000000000000001,$ 00000110000000000000000000000010, . . . , 00000110111111111111111111111111}, a simulated first packet subset that enters the target network through A and that is transmitted from C to an external device may specifically include $FG_{C1}$={00001010000000000000000000000000, 00001010000000000000000000000001, 00001010000000000000000000000010, . . . , 00001010111111111111111111111111}, a simulated first packet subset that enters the target network through A and that is transmitted from D to an external device may specifically include $FG_{D1}$={00001000000000000000000000000000, 00001000000000000000000000000001, 00001000000000000000000000000010, . . . , 00001000111111111111111111111111}, a simulated first packet subset that enters the target network through A and that is transmitted from E to an external device may specifically include $FGE_4$={00001001000000000000000000000000, 00001001000000000000000000000001, 00001001000000000000000000000010, . . . , 00001001111111111111111111111111}, and a simulated first packet subset that enters the target network through A and that is transmitted from F to an external device may specifically include $FG_{F4}$={00000111000000000000000000000000, 00000111000000000000000000000001, 00000111000000000000000000000010, . . . , 00000111111111111111111111111111}. A union set of the five first packet subsets is calculated, that is, the first packet set of the first edge device=$FG_{B1} \cup FG_{C1} \cup FG_{D1} \cup FG_{E4} \cup FG_{F4}$={00000110000000000000000000000000, 00000110000000000000000000000001, . . . , 00001010000000000000000000000000, 00001010000000000000000000000001, . . . , 00001010111111111111111111111111}. There are $5 \times 2^{24}$ headers in total, that is, $5 \times 2^{24}$ packets. Herein, an IP network segment of a destination IP address corresponding to B is 6, an IP network segment of a destination IP address corresponding to C is 10, an IP network segment of a destination IP address corresponding to D is 8, an IP network segment of a destination IP address corresponding to E is 9, and an IP network segment of a destination IP address corresponding to F is 7.

It should be noted that the first packet set may include all simulated packets that enter the network through the first edge device and that are transmitted from the second edge device to the external device, or may be some of simulated packets that enter the network through the first edge device and that are transmitted from the second edge device to the external device. Specific implementations are the same. This is not specifically limited in this embodiment.

It may be understood that simulating the first packet set is equivalent to before verification is performed, analyzing and screening out, from packets that may appear in the network, a packet set that is input through the first edge device and that is transmitted from the second edge device to the external device. In this way, less input data is provided for the subsequent verification. A calculation amount and a verification amount are reduced as much as possible in consideration of both effective and complete verification. In addition, a comparison reference is provided for the subsequent verification. Therefore, in step 602, the first packet set of the first edge device is determined to provide a data basis for verifying a forwarding table corresponding to the transmission action from the first edge device to the second edge device.

Step 603: Input, based on the preconfigured forwarding information, the first packet set through the first edge device in the model corresponding to the network, to obtain a second packet set transmitted from the second edge device.

It may be understood that the preconfigured forwarding information may be obtained in a manner of manually configuring forwarding information or generating forwarding information based on a protocol in advance when the forwarding information needs to be newly configured for the network. However, for insurance, generally, in the built model corresponding to the network, the preconfigured forwarding information is verified by using the simulated first packet set, to simulate whether various actual packets that may enter the network can be accurately forwarded to the outside of the network based on the preconfigured forwarding information of the network.

The preconfigured forwarding information may be specifically preconfigured forwarding information configured for each network device in the network. The preconfigured forwarding information of each network device includes two entries: a destination IP address and an output interface. For details, refer to FIG. 2.

In a specific implementation, the model corresponding to the network may be built on a computer. A status of network devices and interfaces included in the model is fully consistent with the network. Corresponding network address information is set for each edge device in the model based on an IP address of an external device connected to each edge device. In the model, emulating a process of forwarding an actual packet in a real network model specifically includes: inputting the first packet set through the first edge device of the model, performing transmission in the model based on the preconfigured forwarding information, and receiving the output packet from the second edge device of the model, to form the second packet set.

For the determined first edge device and the determined second edge device, in a case, if there is one second edge device, step 603 may be specifically: S31. Obtain the forwarding information preconfigured for the network. S32. Use the first edge device as a root node, and generate a reachability path from the first edge device to the second edge device based on the preconfigured forwarding information. S33. Input the first packet set through the root node (that is, the first edge device), transmit the packet along the reachability path, and obtain the packet output from the second edge device, to form the second packet set.

Figure 7:
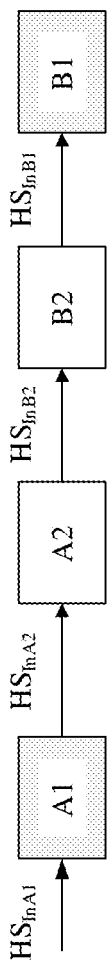
FIG. 7 is a schematic diagram of a reachability path corresponding to an example according to an embodiment of this application.

For example, the target network shown in FIG. 1 is still used as an example. It is assumed that the first edge device is A and the second edge device is B. The simulated first packet set $FG_{B1}$ enters the target network through A, and is transmitted along an "A1-A2-B2-B1" reachability path shown in FIG. 7 based on the forwarding table shown in FIG. 2, to obtain the second packet set transmitted from B to the external device. If the preconfigured forwarding information is accurate and correct, all packets in $FG_{B1}$ should be transmitted from B1. In other words, the second packet set should include the same packets as $FG_{B1}$.

In another case, if there are a plurality of second edge devices, step 602 may specifically include: S41. Obtain the forwarding information preconfigured for the network. S42. Input, based on the preconfigured forwarding information, the first packet set through the first edge device in the model corresponding to the network, to obtain a second packet subset that is transmitted from each second edge device to the external device. S43. Calculate a union set of the second packet subsets transmitted from the second edge devices, and use the union set as the second packet set.

In this case, for example, S42 may specifically include: S421. Use the first edge device as the root node, and generate a reachability tree of the first edge device based on the preconfigured forwarding information. S422. Input the first packet set through the root node to the reachability tree, to obtain a second packet subset output from the second edge device in a leaf node. It should be noted that, if the preconfigured forwarding information is accurate and correct, all leaf nodes of the reachable tree are the second edge devices; or if an error exists in the preconfigured forwarding information, all leaf nodes in the reachable tree may include both the second edge devices and some intermediate nodes. In this way, only packets output by the second edge devices in the leaf nodes need to be added to the second packet set.

Figure 8A:
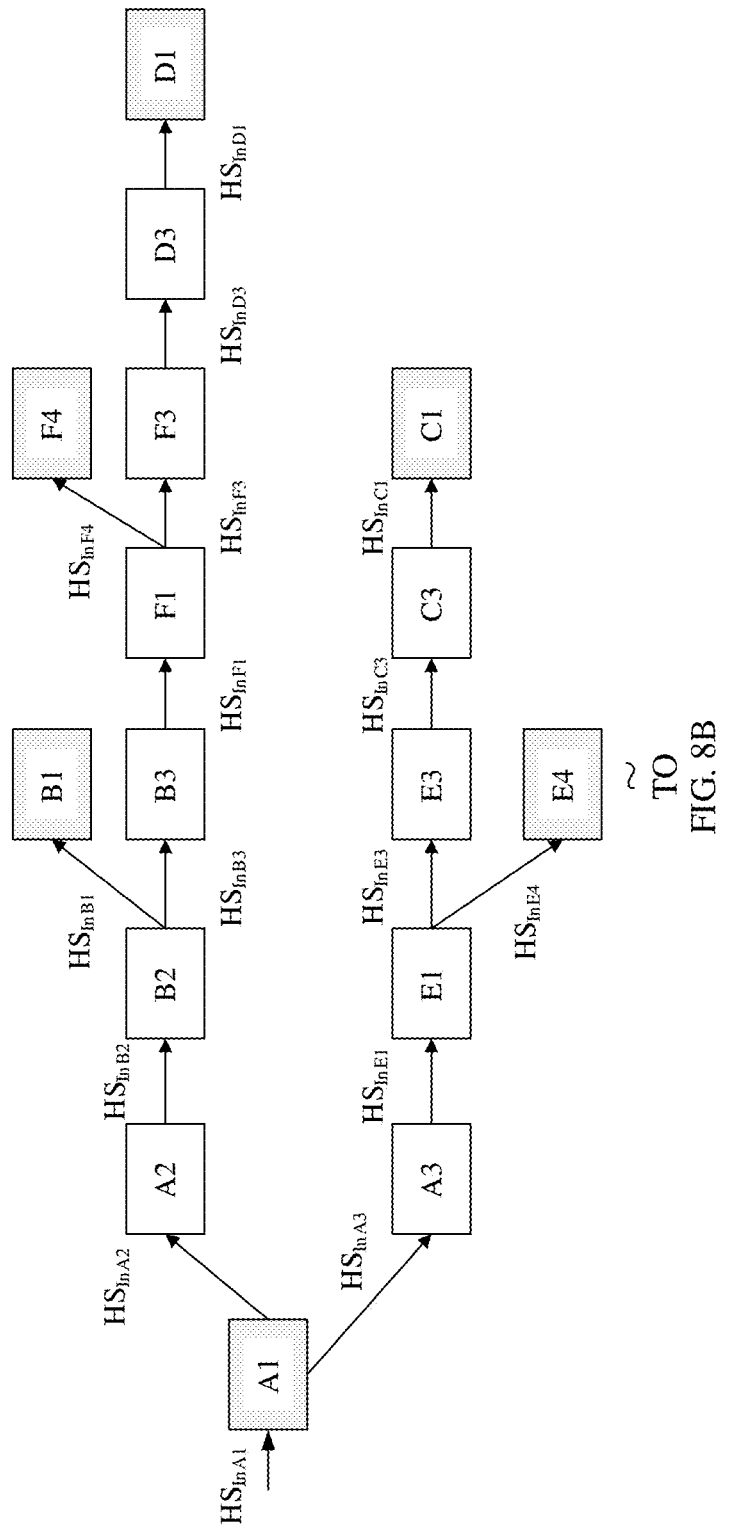

For example, the target network shown in FIG. 1 is still used as an example. It is assumed that the first edge device is A and the five second edge devices are B, C, D, E, and F. In this case, in a first step, A is used as a root node, and the reachability tree shown in FIG. 8A and FIG. 8B is generated based on the forwarding table shown in FIG. 2. The gray shows a leaf node and a root node. In a second step, the simulated first packet set $FG_{B1} \cup FG_{C1} \cup FG_{D1} \cup FG_{E4} \cup FG_{F4}$ enters the network through A, and is transmitted along the reachability tree shown in FIG. 8A and FIG. 8B, to separately obtain five second packet subsets that are transmitted from the second edge devices B, C, D, E, and F in the leaf nodes to external devices. Then, a union set may be obtained based on the five obtained second packet subsets to obtain all the packets transmitted from all the second edge devices. If the preconfigured forwarding information is accurate and correct, all the packets in the first packet set that are input through the first edge device should be transmitted from the five edge devices B, C, D, E, and F. In other words, the second packet set and the first packet set should include the same packets.

Step 604: Determine whether the second packet set is the same as the first packet set; and if the second packet set is the same as the first packet set, perform step 605; or otherwise, perform step 606.

Step 605: Determine that the preconfigured forwarding information corresponding to the transmission action from the first edge device to the second edge device is reachable.

Step 606: Determine that the preconfigured forwarding information corresponding to the transmission action from the first edge device to the second edge device is unreachable.

It may be understood that the first packet set is a packet set generated through simulation. If the preconfigured forwarding information is accurate and correct, the packet in the first packet set enters the network through the first edge device, and the second packet set that is obtained through emulation by simulating the first packet set and the model corresponding to the network and that is all transmitted from the second edge device to the external device should include all the packets in the first packet set. However, once a quantity of packets in the second packet set is less than a quantity of packets in the first packet set, it indicates that a packet enters the network through the first edge device, and is transmitted based on the preconfigured forwarding information but is not output from the second edge device. It indicates that a part of the preconfigured forwarding information corresponding to the transmission action from the first edge device to the second edge device is unreachable.

In some implementations, if reachability verification is completed on all the edge devices in the network, this embodiment of this application may further include: determining whether the preconfigured forwarding information corresponding to the transmission action between all the edge devices in the target network is reachable. If the preconfigured forwarding information is all reachable, it indicates that the preconfigured forwarding information is accurate and correct, and the preconfigured forwarding information may be actually configured for the network for use to determine reliable network operation. If the preconfigured forwarding information is not all reachable, it indicates that an error exists in the preconfigured forwarding information corresponding to the transmission action from at least one edge device to another edge device in the network, and the forwarding information cannot be actually configured for the network for use to determine that the network is unreachable. In this case, new reachable preconfigured forwarding information may be newly generated. Alternatively, it may be ensured that the accurate and correct forwarding information is configured for the operating network through correcting the preconfigured forwarding information. In this way, reachability verification may be performed on a relatively small quantity of edge devices, to complete comprehensive reachability verification on the entire network, thereby ensuring accuracy of the preconfigured forwarding table actually configured for the target network and improving network security and reliability.

In an example, if it is determined that the preconfigured forwarding information corresponding to the transmission action from the first edge device to the second edge device is unreachable, a specific problematic forwarding entry may be located based on a difference between the first packet set and the second packet set. In other words, when it is determined that an unreachability problem exists, this embodiment of this application may further include: comparing the first packet set with the second packet set to obtain a differential packet; and determining, based on the differential packet, that an incorrect forwarding entry exists in the preconfigured forwarding information. It may be understood that when the second packet set is compared with the first packet set, a packet absent from the second packet set is the differential packet. A cause for the differential packet is that an error exists in the preconfigured forwarding information. The differential packet is input to the network through the first edge device. If the differential packet is transmitted based on the incorrect preconfigured forwarding information, the differential packet cannot be output from the second edge device. In a specific implementation, a feature of the differential packet may be analyzed to locate an incorrect forwarding entry in the preconfigured forwarding information. Alternatively, the differential packet may be input through the first edge device to the model corresponding to the network again. In this case, the differential packet is still transmitted based on the incorrect forwarding information, to track a location of an error in the differential packet. In this way, an incorrect forwarding entry in the forwarding information is located.

It may be learned that, in the reachability verification method provided in this embodiment of this application, the packet that may enter the network through the first edge device and that may be transmitted from the second edge device to the external device may be screened out in advance based on the first network address information of the second edge device, to form the first packet set. Based on the first packet set and the simulated model corresponding to the network, it is verified whether the preconfigured forwarding information corresponding to the transmission action from the first edge device to the second edge device in the preconfigured forwarding table configured for the network is correct. Because the first packet set obtained through screening includes a relatively small quantity of packets and verification is performed only on the edge devices, a calculation amount and a verification amount of the reachability verification are greatly reduced. In addition, the simulated first packet set is used as a result that should be output, and the first packet set is compared with the actually output second packet set, to implement automatic reachability verification. Therefore, in this verification manner, efficiency of reachability verification is improved, and verification costs are reduced, thereby improving network security and reliability.

It should be noted that, because a plurality of output interfaces may be configured for the same network address information in forwarding information of a network device, the same packet is output from the network for a plurality of times, and a duplicate packet record occurs, thereby affecting accuracy of the reachability verification. In this embodiment of this application, a union set calculation manner is used to avoid this problem, thereby improving accuracy of the verification manner.

Figure 9:
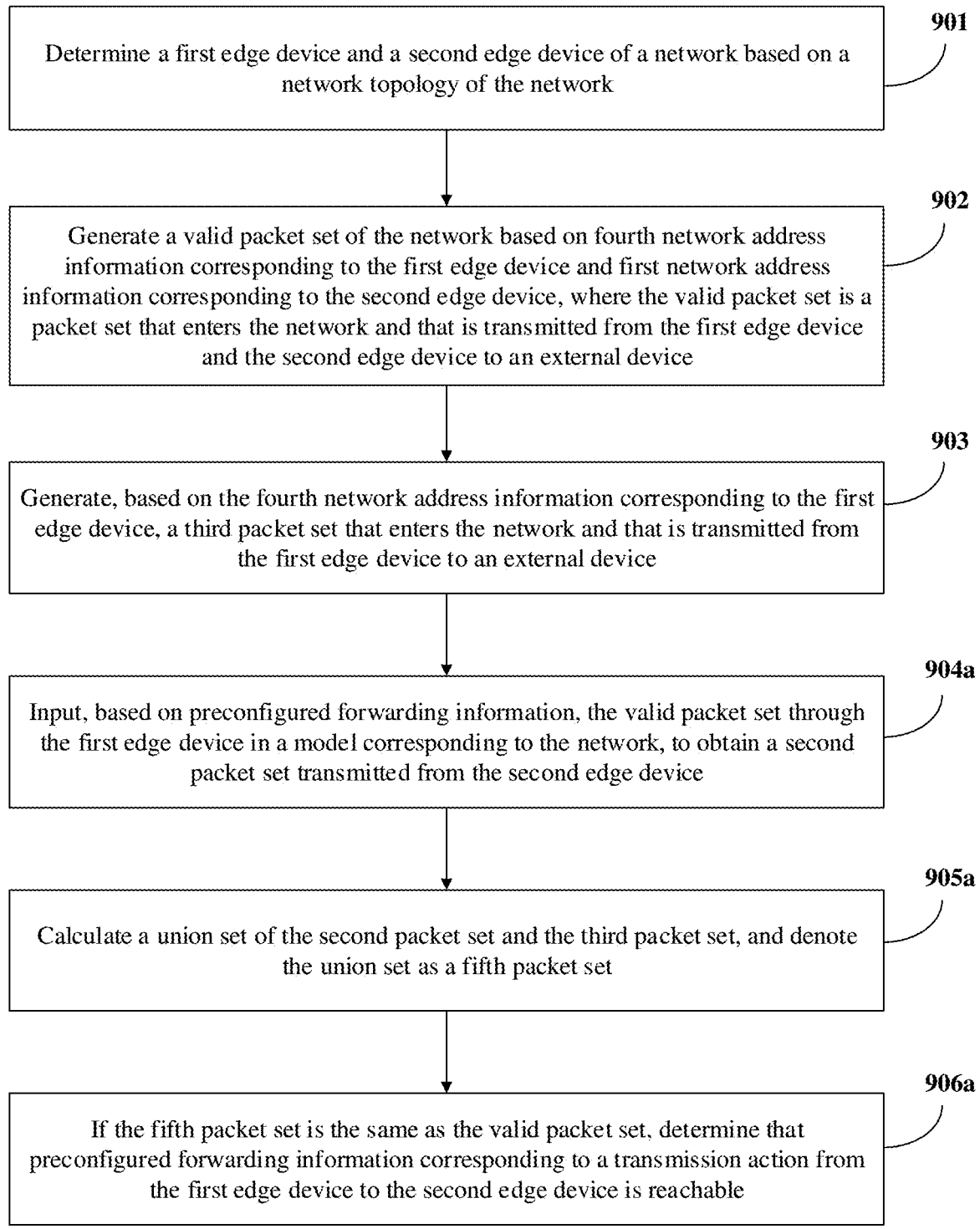
FIG. 9 is a schematic flowchart of still another reachability verification method according to an embodiment of this application.
Figure 10:
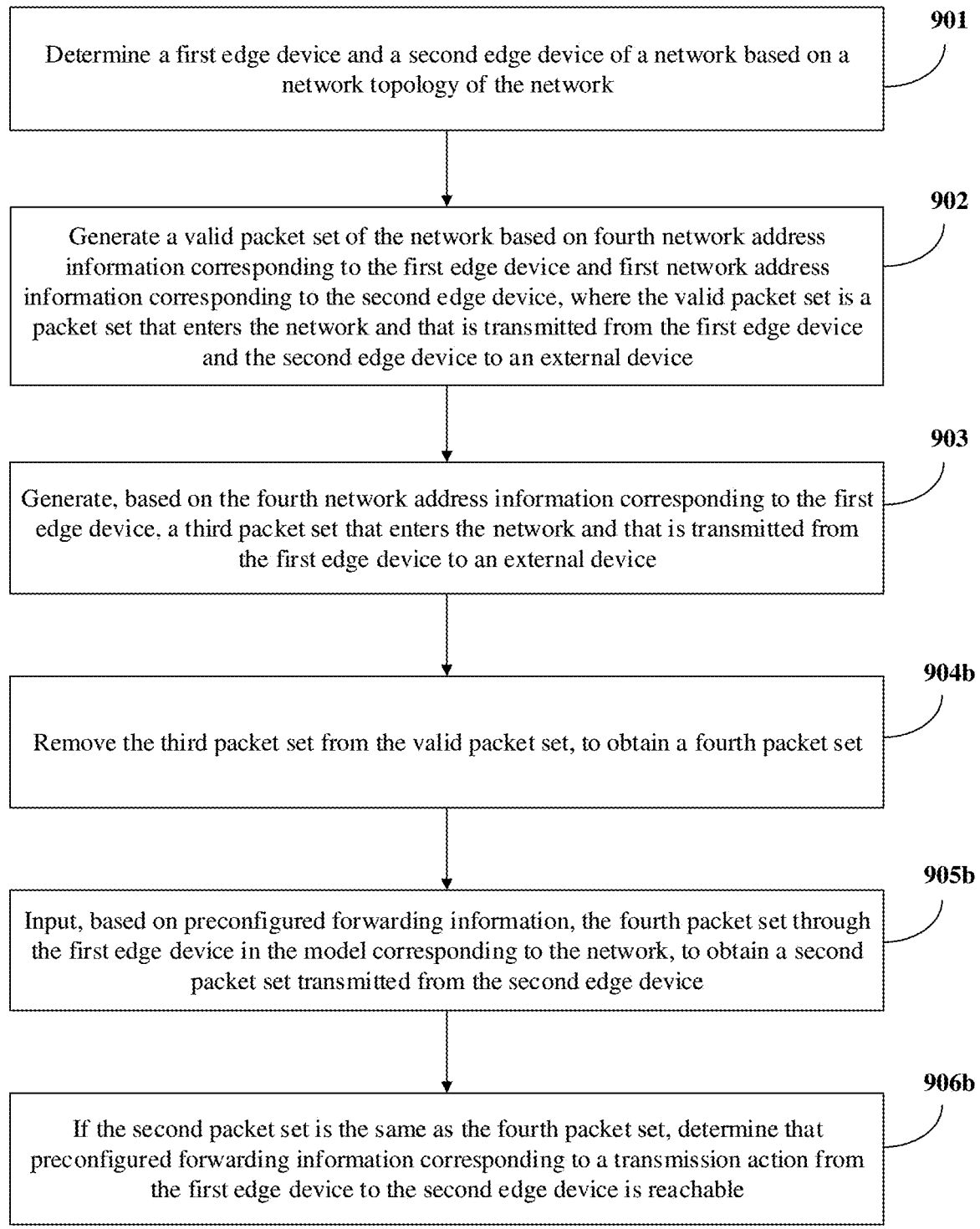
FIG. 10 is a schematic flowchart of yet another reachability verification method according to an embodiment of this application.

In addition, this embodiment of this application further provides another reachability verification method, to further reduce a calculation amount and a verification amount, thereby improving time validity of the reachability verification especially for the target network including more than two edge devices. The method may specifically include steps shown in FIG. 9 (including the following step 901 to step 903 and step 904a to step 906a). Alternatively, steps (including the following step 901 to step 903 and step 904b to step 906b) shown in FIG. 10 may be performed. Some or all of the operations may be performed by a control device.

Step 901: Determine a first edge device and a second edge device of a network based on a network topology of the network.

It may be understood that reference may be made to related descriptions of step 601 in the embodiment shown in FIG. 6 for specific descriptions of step 901. Details are not described herein again.

Step 902: Generate a valid packet set of the network based on fourth network address information corresponding to the first edge device and first network address information corresponding to the second edge device. The valid packet set is a packet set that enters the network and that is transmitted from the first edge device and the second edge device to an external device.

It should be noted that the valid packet set of the target network may be generated to further reduce a calculation amount of reachability verification and improve verification efficiency. In this way, when verification is performed on each edge device, a "first packet set" corresponding to the edge device does not need to be calculated. Regardless of which edge device is verified, simple processing and emulation and simulation may be performed on the valid packet set, to complete reachability verification.

It may be understood that reference may be made to related descriptions of step 602 for specific descriptions of generating the first packet set through simulation based on the first network address information corresponding to the second edge device. In addition, the packet set that enters the network and that is transmitted from the first edge device to the external device is generated through simulation based on the fourth network address information corresponding to the first edge device. This is similar to a process of generating the first packet set through simulation. In other words, refer to the related descriptions of step 602 for an implementation of generating the packet set.

For example, the target network shown in FIG. 1 is still used as an example. It is assumed that the first edge device is A and the five second edge devices are B, C, D, E, and F. The simulated packet set that enters the network and that is transmitted from B, C, D, E, and F to external devices is $FG_1 = FG_{B1} \cup FG_{C1} \cup FG_{D1} \cup FG_{E4} \cup FG_{F4}$ = {0000011000000 0000000000000000000, 000001100000000000000000000000001, . . . , 000001010000000000000000000000000, 000001010000000000000000000000001, . . . , 000001010111111111111111111111111}. A simulated packet set that enters the network and that is transmitted from A to the external device is $FG_2 = FG_{A1}$ = {000001010000000000000000000000000, 000001010000000000000000000000001, . . . , 000001010111111111111111111111111}. A destination IP address corresponding to A is 5.0.0.0/8. Valid packets of the network are $FG_1 \cup FG_2$ = {000001010000000000000000000000000, 000001010000000000000000000000001, . . . , 000001010000000000000000000000000, 000001010000000000000000000000001, . . . , 000001010111111111111111111111111}. There are $6 \times 2^{24}$ headers in total, that is, $6 \times 2^{24}$ packets.

Step 903: Generate, based on the fourth network address information corresponding to the first edge device, a third packet set that enters the network and that is transmitted from the first edge device to an external device.

It may be understood that, in a related example of step 902, a packet set $FG_2 = FG_{A1}$ = {000001010000000000000000000000000, 000001010000000000000000000000001, . . . , 000001010111111111111111111111111} is the third packet set in step 903. The third packet set may be specifically obtained in the following manner: determining, based on an IP address of an external device connected to the first edge device, the fourth network address information corresponding to the first edge device; and then simulating, based on the fourth network address information corresponding to the first edge device, all packets that enter the network and that are transmitted from the first edge device to the external device, to form the third packet set.

It should be noted that there is no sequence of performing step 902 and step 903. Either one of step 902 and step 903 may be performed first, or step 902 and step 903 may be simultaneously performed. This is not limited herein.

In some implementations, the following step 904a to step 906a may be performed after step 903.

Step 904a: Input, based on the preconfigured forwarding information, the valid packet set through the first edge device in the model corresponding to the network, to obtain a second packet set transmitted from the second edge device.

Step 905a: Calculate a union set of the second packet set and the third packet set, and denote the union set as a fifth packet set.

Step 906a: If the fifth packet set is the same as the valid packet set, determine that preconfigured forwarding information corresponding to a transmission action from the first edge device to the second edge device is reachable.

It should be noted that, because a packet that enters the network and that is transmitted from the first edge device to the external device is simulated based on the third packet set in the valid packet set, the third packet set is input, based on the preconfigured forwarding information, through the first edge device in the model corresponding to the network, but the third packet set cannot be all output from the second edge device. In other words, the second packet set includes only a packet that enters the network and that is transmitted from the first edge device to the external device. Therefore, if a preconfigured forwarding table is accurate and correct, when the second packet set is compared with the input valid packet set, the second packet set is less than the valid packet set exactly by the packets in the third packet set.

In a specific implementation, after the second packet set is obtained through emulation and simulation, the union set of the third packet set and the second packet set may be first calculated, and a result of the union set (that is, the fifth packet set) is compared with the valid packet set of the network. If the two are the same, it indicates that the second packet set is less than the valid packet set exactly by the packets in the third packet set. In other words, packets that should be output from the second edge device are all accurately and correctly output. In this case, it may be determined that the preconfigured forwarding information corresponding to the transmission action from the first edge device to the second edge device is reachable. If the two are different, it indicates that the second packet set is less than the valid packet set by the packets in the third packet set and other packets. In other words, some of packets that should be output from the second edge device are not output. In this case, it may be determined that the preconfigured forwarding information corresponding to the transmission action from the first edge device to the second edge device is unreachable.

In some other implementations, to reduce packets input to the network model as much as possible, that is, to reduce a verification amount and improve verification efficiency as much as possible, the following step 904b to step 906b may be performed after step 903.

Step 904b: Remove the third packet set from the valid packet set, to obtain a fourth packet set.

Step 905b: Input, based on preconfigured forwarding information, the fourth packet set through the first edge device in the model corresponding to the network, to obtain a second packet set transmitted from the second edge device.

Step 906b: If the second packet set is the same as the fourth packet set, determine that preconfigured forwarding information corresponding to a transmission action from the first edge device to the second edge device is reachable.

Because a packet that enters the network and that is transmitted from the first edge device to the external device is simulated based on the third packet set in the valid packet set, the third packet set is input based on the preconfigured forwarding information through the first edge device in the model corresponding to the network, and definitely cannot all be output from the second edge device. In a specific implementation, to reduce a verification amount, before an emulation and simulation process, the third packet set may be removed from the valid packet set, to obtain the fourth packet set. Then, the fourth packet including a relatively small quantity of packets is input based on the preconfigured forwarding information through the first edge device in the model corresponding to the network, to obtain the second packet set transmitted from the second edge device. Finally, the second packet is compared with the fourth packet set to determine whether the two are the same, to further determine whether the preconfigured forwarding information corresponding to the transmission action from the first edge device to the second edge device is reachable.

It may be learned that, in the reachability verification method provided in this embodiment of this application, the packet that may enter the network and that may be transmitted from the first edge device and the second edge device to the external device may be screened out in advance based on the first network address information of the second edge device and the fourth network address information corresponding to the first edge device, to form the valid packet set. Based on the valid packet set and the simulated model corresponding to the target network, it is verified whether the preconfigured forwarding information that corresponds to the transmission action from the first edge device to the second edge device and that is in the preconfigured forwarding information configured for the network is correct. Because the first packet set obtained through screening includes a relatively small quantity of packets and verification is performed only on the edge devices, a calculation amount and a verification amount of the reachability verification are greatly reduced. In addition, the simulated valid packet set is used as a verification reference that is to be compared with the actually output second packet set, to implement automatic reachability verification. Therefore, in this verification manner, efficiency of reachability verification is improved, and verification costs are reduced, thereby improving network security and reliability.

Figure 11A:
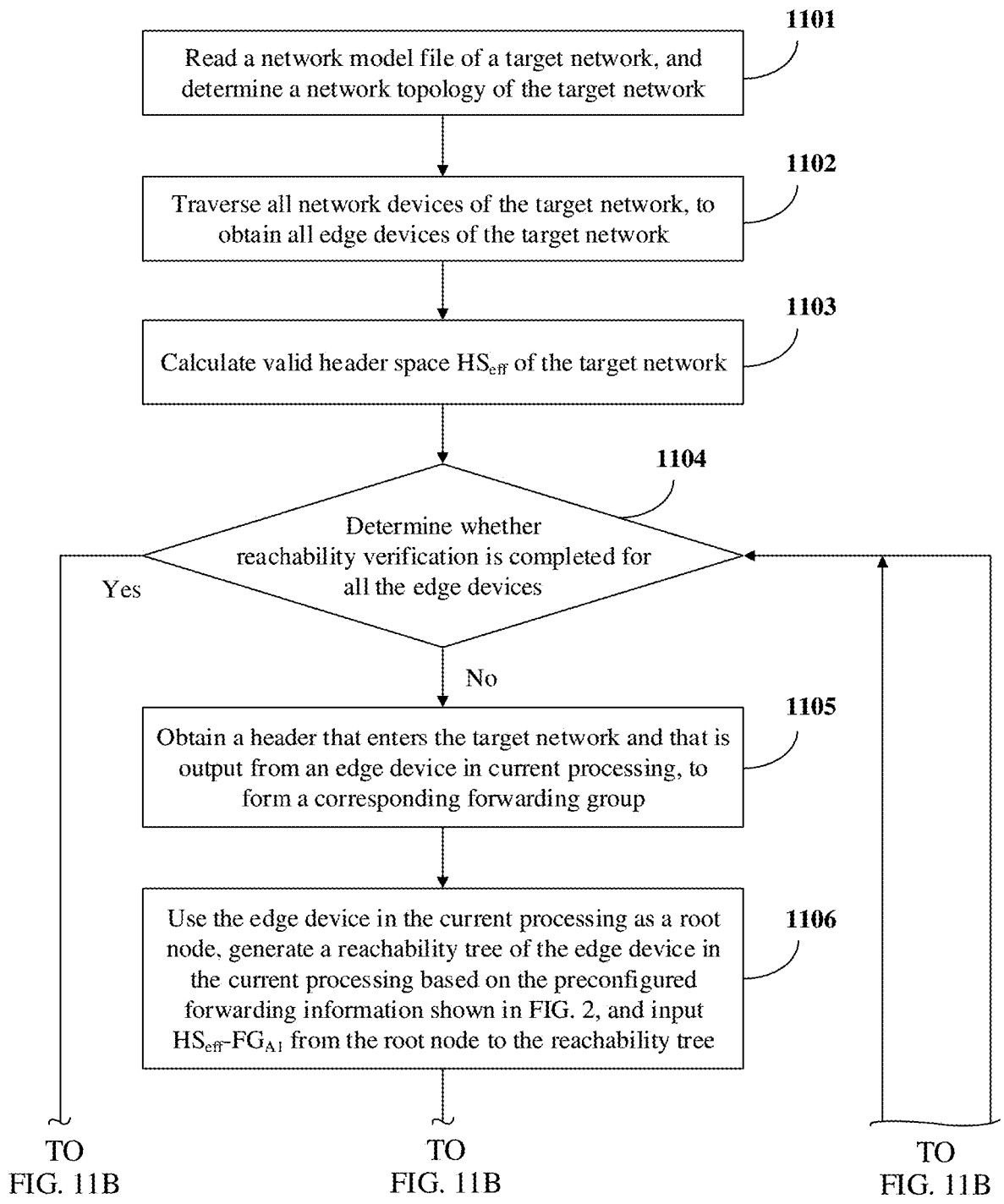
FIG. 11A and FIG. 11B are a schematic flowchart of an instance of a reachability verification method according to an embodiment of this application.
Figure 11B:
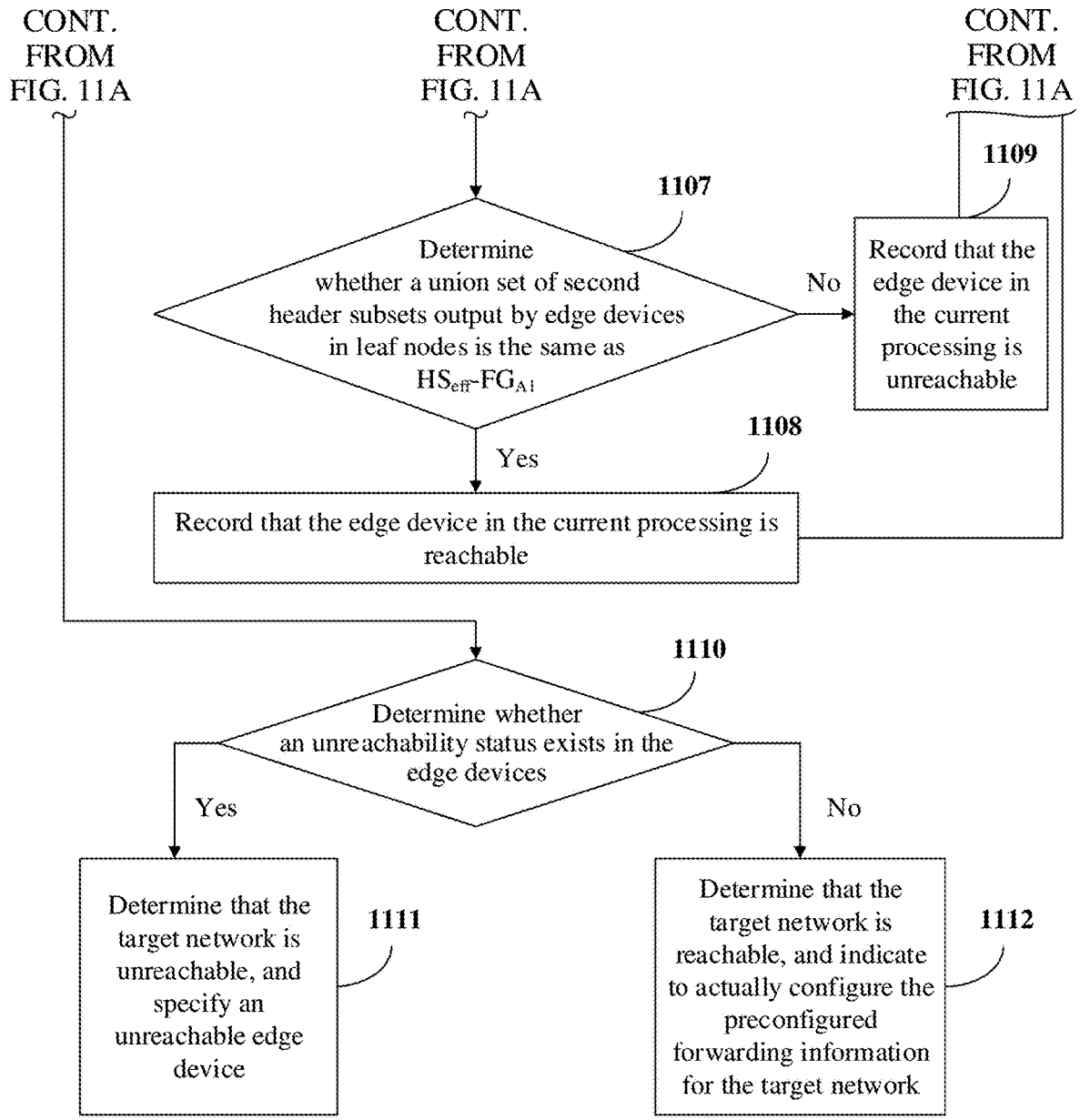

After the content of this embodiment of this application is described, to make the method provided in this embodiment of this application more clearly, the following describes a specific scenario example in the embodiments of this application with reference to FIG. 11A and FIG. 11B by using the network shown in FIG. 1 as an example.

FIG. 11A and FIG. 11B are a schematic flowchart of a reachability verification method according to an embodiment of this application. The method may specifically include the following step 1101 to step 1112. Some or all of the following operations may be performed by a control device.

Step 1101: Read a network model file of a target network, and determine a network topology of the target network.

It should be noted that the network topology of the target network is specifically shown in FIG. 1 and includes network devices A, B, C, D, E, and F.

Step 1102: Traverse all network devices of the target network, to obtain all edge devices of the target network.

It may be understood that all the six network devices in the target network are traversed to obtain six edge devices that are respectively A, B, C, D, E, and F.

Step 1103: Calculate valid header space $HS_{\mathit{eff}}$ of the target network.

It may be understood that a packet in a valid packet set may be a simulated complete packet including a header, or may be a character string in which only a header part is simulated. If the valid packet set is a set of character strings with header parts, the valid header space is the valid packet set.

In a specific implementation, for each edge device, a header that enters the target network and that is output from the edge device to an external device is calculated, and the header corresponding to the edge device is added to the valid header set. When all the edge devices are traversed, the obtained valid header set is the final valid header set. For example, for the obtained target network, $HS_{\mathit{eff}}$={0000010100000000000000000000000, 0000010100000000000000000000001, . . . , 0000010100000000000000000000000, 0000010100000000000000000000001, . . . , 0000010101111111111111111111111}.

Step 1104: Determine whether reachability verification is completed for all the edge devices; and if the reachability verification is completed, perform step 1110; or otherwise, perform step 1105.

Step 1105: Obtain a header that enters the target network and that is output from an edge device in current processing, to form a corresponding forwarding group.

For example, it is assumed that the edge device in the current processing is A. In this case, the forwarding group corresponding to A is $FG_{A1}$={00000101000000000000000000000000, 00000101000000000000000000000001, . . . , 00000101111111111111111111111111}.

Step 1106: Use the edge device in the current processing as a root node, generate a reachability tree of the edge device in the current processing based on the preconfigured forwarding information shown in FIG. 2, and input $HS_{eff}\text{-}FG_{A1}$ from the root node to the reachability tree.

Step 1107: Determine whether a union set of second header subsets output by edge devices in leaf nodes is the same as $HS_{eff}\text{-}FG_{A1}$; and if the union set is the same as $HS_{eff}\text{-}FG_{A1}$, perform step 1108; or otherwise, perform step 1109.

It may be understood that, on the reachability tree shown in FIG. 8A and FIG. 8B, the union set of the second header subsets output by the edge devices corresponding to the leaf nodes is $HS_{union}=HS_{InB1} \cup HS_{InC1} \cup HS_{InD1} \cup HS_{InE4} \cup HS_{InF4}$={00000110000000000000000000000000, 00000110000000000000000000000001, . . . , 00000101000000000000000000000000, 00000101000000000000000000000001, . . . , 00000101011111111111111111111111}. If $HS_{eff}\text{-}FG_{A1}=HS_{union}$, step 1108 is performed; or otherwise, step 1109 is performed.

Step 1108: Record that the edge device in the current processing is reachable, and go back to and perform step 1104.

Step 1109: Record that the edge device in the current processing is unreachable, and go back to and perform step 1104.

Step 1110: Determine whether an unreachability status exists in the edge devices; and if the unreachability status exists, perform step 1111; or otherwise, perform step 1112.

Step 1111: Determine that the target network is unreachable, and specify an unreachable edge device.

Step 1112: Determine that the target network is reachable, and indicate to actually configure the preconfigured forwarding information for the target network.

It may be learned that, in the reachability verification method used in this embodiment, the valid header space is introduced, and verification is performed on a relatively small quantity of edge devices in the network from a general reachability aspect. In this way, reachability verification can be simply and efficiently implemented on a network with a more complex structure, thereby improving network reliability and security.

Figure 12:
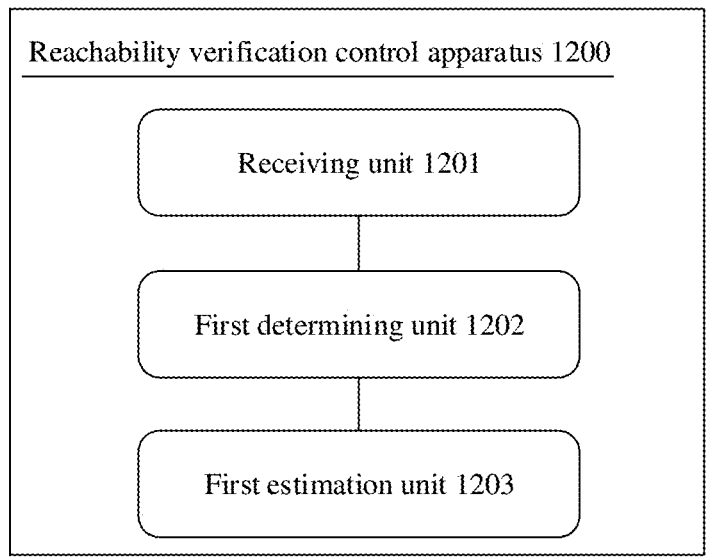
FIG. 12 is a schematic structural diagram of a reachability verification control apparatus according to an embodiment of this application.

As shown in FIG. 12, an embodiment of this application further shows a reachability verification control apparatus 1200 according to this embodiment of this application. The apparatus 1200 may include a receiving unit 1201, a first determining unit 1202, and a first estimation unit 1203.

In a specific implementation, the apparatus 1200 may be configured to perform the foregoing reachability verification method corresponding to FIG. 3.

For example, the receiving unit 1201 is configured to receive forwarding information of a plurality of network devices in a network. The plurality of network devices include a first edge device and a second edge device. The first determining unit 1202 is configured to determine, based on the forwarding information of the second edge device, information about a first network address that is reachable to the second edge device and that is outside the network. The first estimation unit 1203 is configured to estimate, based on the first network address information and the forwarding information of the plurality of network devices, whether one or more packets whose destination addresses are covered by the first network address information and that enter the network through the first edge device can be forwarded to the second edge device through the network. The forwarding information of the second edge device is forwarding information used to indicate the second edge device to forward a packet to the outside of the network, and the first network address information is determined based on a destination internet protocol IP address in the forwarding information of the second edge device.

In this way, the reachability verification control apparatus 1200 provided in this embodiment of this application can estimate reachability between edge devices based on information about a network address reachable to the edge device. In other words, verification is performed only for the edge devices, thereby greatly reducing a calculation amount and a verification amount of the reachability verification. In addition, a forwarding status of a packet is theoretically estimated to verify whether the packet is forwarded according to an expected plan of the network, thereby implementing automatic reachability verification. Further, reachability verification may be further quickly and effectively performed between all the edge devices in the network, to improve efficiency of reachability verification of the network and reduce verification costs, thereby improving network security and reliability.

In an example, the first estimation unit 1203 may specifically include: a first determining subunit, configured to determine an IP address based on the first network address information; a second determining subunit, configured to determine, based on the IP address and the forwarding information of the plurality of network devices, an edge device through which a packet that uses the IP address as a destination IP address is forwarded to the outside of the network after entering the network through the first edge device; and an analysis subunit, configured to analyze whether the edge device through which the packet is forwarded to the outside of the network is the second edge device.

It should be noted that reference may be made to related descriptions of step 3031 to step 3033 in FIG. 4 for a related implementation of this example. Details are not described herein again.

It may be understood that, if the plurality of network devices further include a third edge device, the apparatus 1200 further includes a second determining unit and a second estimation unit. The second determining unit is configured to determine, based on the forwarding information of the third edge device, information about a second network address that is reachable to the third edge device and that is outside the network. The second estimation unit is configured to estimate, based on the second network address information and the forwarding information of the plurality of network devices, whether a plurality of packets whose destination addresses are covered by the second network address information and that enter the network through the first edge device can be forwarded to the third edge device through the network.

In some other implementations, the apparatus 1200 may further include: a third determining unit, configured to: if it is estimated based on the first network address information and the forwarding information of the plurality of network devices that the one or more packets whose destination addresses are covered by the first network address information and that enter the network through the first edge device can be forwarded to the second edge device through the network, determine that the second edge device is reachable to the first edge device; and a fourth determining unit, configured to: if it is estimated based on the first network address information and the forwarding information of the plurality of network devices that the one or more packets whose destination addresses are covered by the first network address information and that enter the network through the first edge device cannot be forwarded to the second edge device through the network, determine that the second edge device is unreachable to the first edge device.

In still some other implementations, the apparatus 1200 may further include: a fifth determining unit, configured to: if reachability is implemented between all the edge devices in the network, determine that the network is reachable; and a sixth determining unit, configured to: if reachability is not implemented between at least one pair of edge devices in the network, determine that the network is unreachable. If the sixth determining unit determines that the network is unreachable, the apparatus 1200 may further include: a seventh determining unit, configured to: if it is determined that the network is unreachable, determine that a fifth edge device is unreachable to a fourth edge device in the network; and a locating unit, configured to locate incorrect forwarding information from corresponding forwarding information from the fourth edge device to the fifth edge device.

It should be noted that the reachability verification control apparatus 1200 in this embodiment of this application may perform all operations performed by the control device in the embodiments corresponding to FIG. 3 to FIG. 11A and FIG. 11B. For implementation effects, refer to related descriptions in the foregoing method embodiment corresponding to FIG. 3. Details are not described herein again.

Figure 13:
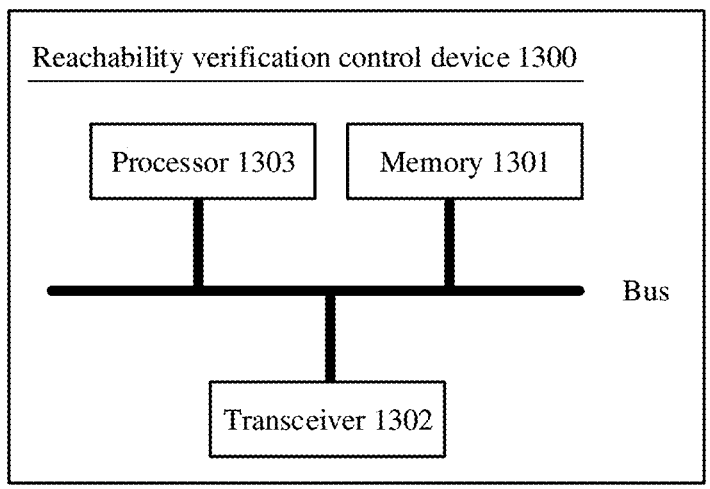
FIG. 13 is a schematic structural diagram of a reachability verification control device according to an embodiment of this application.

FIG. 13 is a possible schematic structural diagram of a reachability verification control device according the foregoing embodiments. As shown in FIG. 13, the reachability verification control device 1300 includes a memory 1301, a transceiver 1302, and a processor 1303. The memory 1301 is configured to be coupled to the processor 1303. The memory 1301 stores a computer program that is necessary for the reachability verification control device 1300.

In a specific implementation, the processor 1303 is configured to support the reachability verification control device 1300 in implementing a corresponding function of the method in the embodiment shown in FIG. 3. The transceiver 1302 is configured to implement communication between the foregoing reachability verification control device 1300 and another device. The reachability verification control device 1300 may include the memory 1301. The memory 1301 is configured to be coupled to the processor 1303. The memory 1301 stores a program instruction and data that are necessary for the reachability verification control device 1300.

It may be understood that the reachability verification control device 1300 may use the processor 1303 to execute, according to a computer readable instruction in the memory 1301, content corresponding to FIG. 3, for example, step 301 to step 303, and content corresponding to FIG. 4 and FIG. 5. In addition, the control device 1300 may further implement the method by using the processor 1303 according to the computer readable instruction in the memory 1301, to perform reachability verification of a network. The reachability verification control device 1300 may further be the reachability verification control apparatus 1200 in the embodiment corresponding to FIG. 12. It should be noted that units in the foregoing reachability verification control apparatus 1200 (for example, the receiving unit 1201, the first determining unit 1202, and the first estimation unit 1203) may be software units or hardware units. If the units in the reachability verification control apparatus 1200 are software units, these software units may be software units that are stored in the computer readable instruction in the memory 1301 of the reachability verification control device 1300. If the units in the reachability verification control apparatus 1200 are hardware units, in an example, any unit in the control apparatus 1200 may be understood as being implemented based on the processor 1303, the memory 1301, and the computer readable instruction for implementing a function of the unit in the memory 1301.

It should be noted that, based on the processor 1303, the memory 1301, and the computer readable instruction for implementing the function of the unit in the memory 1301, the reachability verification control device 1300 in this embodiment of this application may perform all operations performed by the control device in the embodiments corresponding to FIG. 3 to FIG. 11A and FIG. 11B. For implementation effects, refer to related descriptions in the foregoing embodiments corresponding to FIG. 3 to FIG. 11A and FIG. 11B. Details are not described herein again.

The word "first" in a name such as a "first edge device" or "first network address information" mentioned in the embodiments of this application is merely used as a name identifier, and does not mean being the first in a sequence. This rule is also applicable to "second".

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a read-only memory (ROM)/ RAM, a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner. For same or similar parts in the embodiments, refer to these embodiments. Each embodiment focuses on a difference from other embodiments. Especially, apparatus and device embodiments are basically similar to a method embodiment, and therefore are described briefly. For related parts, refer to partial descriptions in the method embodiment. The described apparatus and device embodiments are merely an example. Modules described as separate parts may or may not be physically separate, and parts displayed as modules may or may not be physical modules. In other words, the modules may be located in one position, or may be distributed on a plurality of network units. Some or all the modules may be selected according to actual requirements to achieve the objectives of the solutions of the embodiments. A person of ordinary skill in the art may understand and implement the embodiments without creative efforts.

The foregoing descriptions are merely example implementations of this application, and not intended to limit the protection scope of this application.

What is claimed is:

1. A method, comprising:
receiving, by a control device, forwarding information of a plurality of network devices in a network;
performing a reachability analysis for a first target edge device of the plurality of network devices and a second target edge device of the plurality of target edge device by:
   determining, by the control device based on forwarding information of the second target edge device, information about a first network address that is reachable by the second target edge device and that is outside the network; and
   estimating, by the control device based on the information of the first network address and the forwarding information of the plurality of network devices, whether one or more packets whose destination addresses are covered by the information of the first network address and that enter the network through the first target edge device are able to be forwarded from the first target edge device to the second target edge device through the network; and
successively selecting a new first target edge device and new second target edge device from the plurality of target edge devices, and performing the reachability analysis using the new first target edge device as the first target edge device and the new second target edge device as the second target edge device, until the reachability analysis is performed for each pair of edge devices of the plurality of network devices.

2. The method according to claim 1, wherein the forwarding information of the second target edge device indicates that the second target edge device forwards a packet outside of the network, and the information of the first network address is determined based on a destination internet protocol (IP) address in the forwarding information of the second target edge device.

3. The method according to claim 1, wherein estimating, by the control device based on the information of the first network address and the forwarding information of the plurality of network devices, whether the one or more packets whose destination addresses are covered by the information of the first network address and that enter the network through the first target edge device are able to be forwarded from the first target edge device to the second target edge device through the network comprises:
   determining, by the control device, an internet protocol (IP) address based on the information of the first network address;
   determining, by the control device based on the IP address and the forwarding information of the plurality of network devices, an edge device through which a packet that uses the IP address as a destination IP address is forwarded outside of the network after entering the network through the first target edge device; and
   analyzing, by the control device, whether the determined edge device through which the packet is forwarded to the outside of the network is the second target edge device.

4. The method according to claim 1, wherein:
in response to the control device estimating, based on the information of the first network address and the forwarding information of the plurality of network devices, that the one or more packets whose destination addresses are covered by the information of the first network address and that enter the network through the first target edge device are able to be forwarded from the first target edge device to the second target edge device through the network, the control device determines that the second target edge device is reachable to the first target edge device; or
in response to the control device estimating, based on the information of the first network address and the forwarding information of the plurality of network devices, that the one or more packets whose destination addresses are covered by the information of the first network address and that enter the network through the first edge device cannot be forwarded from the first target edge device to the second target edge device through the network, the control device determines that the second target edge device is unreachable to the first target edge device.

5. The method according to claim 1, further comprising:
when reachability is implemented between all edge devices in the network, determining, by the control device, that the network is reachable; or
when reachability is not implemented between at least one pair of edge devices in the network, determining, by the control device, that the network is unreachable.

6. The method according to claim 5, wherein the method further comprises:
in response to the control device determining that the network is unreachable, determining, by the control device, that a fifth edge device is unreachable to a fourth edge device in the network; and
locating, by the control device, incorrect forwarding information from corresponding forwarding information from the fourth edge device to the fifth edge device.

7. An apparatus, comprising:
a receiver, configured to receive forwarding information of a plurality of network devices in a network; and
a processor, configured to:
   perform a reachability analysis for a first target edge device of the plurality of network devices and a second target edge device of the plurality of target edge device by:
      determining, based on forwarding information of the second target edge device, information about a first network address that is reachable by the second target edge device and that is outside the network;
   estimating, based on the information of the first network address and the forwarding information of the plurality of network devices, whether one or more packets whose destination addresses are covered by the information of the first network address and that enter the network through the first target edge device are able to be forwarded from the first target edge device to the second target edge device through the network; and
   successively selecting a new first target edge device and new second target edge device from the plurality of target edge devices, and performing the reachability analysis using the new first target edge device as the first target edge device and the new second target edge device as the second target edge device, until the reachability analysis is performed for each pair of edge devices of the plurality of network devices.

8. The apparatus according to claim 7, wherein the forwarding information of the second target edge device indicates that the second target edge device forwards a packet outside of the network, and the information of the first network address is determined based on a destination internet protocol (IP) address in the forwarding information of the second target edge device.

9. The apparatus according to claim 7, wherein the processor is further configured to:
  determine an internet protocol (IP) address based on the information of the first network address;
  determine, based on the IP address and the forwarding information of the plurality of network devices, an edge device through which a packet that uses the IP address as a destination IP address is forwarded outside of the network after entering the network through the first target edge device; and
  analyze whether the determined edge device through which the packet is forwarded outside of the network is the second target edge device.

10. The apparatus according to claim 7, wherein the processor is configured to:
  in response to estimating, based on the information of the first network address and the forwarding information of the plurality of network devices, that the one or more packets whose destination addresses are covered by the information of the first network address and that enter the network through the first edge device are able to be forwarded from the first target edge device to the second target edge device through the network, determine that the second target edge device is reachable to the first target edge device; and
  in response to estimating, based on the information of the first network address and the forwarding information of the plurality of network devices, that the one or more packets whose destination addresses are covered by the information of the first network address and that enter the network through the first edge device cannot be forwarded from the first target edge device to the second target edge device through the network, determine that the second target edge device is unreachable to the first target edge device.

11. The apparatus according to claim 7, wherein the processor is further configured to:
  when reachability is implemented between all edge devices in the network, determine that the network is reachable; and
  when reachability is not implemented between at least one pair of edge devices in the network, determine that the network is unreachable.

12. The apparatus according to claim 11, wherein the processor is further configured to:
  in response to determining that the network is unreachable, determine that a fifth edge device is unreachable to a fourth edge device in the network; and
  locate incorrect forwarding information from corresponding forwarding information from the fourth edge device to the fifth edge device.

13. A non-transitory storage medium, comprising computer program or instructions which, when executed by a computer, cause the computer to carry out:
  receiving forwarding information of a plurality of network devices in a network;
  performing a reachability analysis for a first target edge device of the plurality of network devices and a second target edge device of the plurality of target edge device by:
    determining, based on forwarding information of the second edge device, information about a first network address that is reachable by the second target edge device and that is outside the network; and
    estimating, based on the information of the first network address and the forwarding information of the plurality of network devices, whether one or more packets whose destination addresses are covered by the information of the first network address and that enter the network through the first target edge device are able to be forwarded from the first target edge device to the second target edge device through the network; and
  successively selecting a new first target edge device and new second target edge device from the plurality of target edge devices, and performing the reachability analysis using the new first target edge device as the first target edge device and the new second target edge device as the second target edge device, until the reachability analysis is performed for each pair of edge devices of the plurality of network devices.

14. The non-transitory storage medium according to claim 13, wherein the forwarding information of the second target edge device indicates that the second target edge device forwards a packet outside of the network, and the information of the first network address is determined based on a destination internet protocol (IP) address in the forwarding information of the second target edge device.

15. The non-transitory storage medium according to claim 13, wherein estimating, based on the information of the first network address and the forwarding information of the plurality of network devices, whether one or more packets whose destination addresses are covered by the information of the first network address and that enter the network through the first target edge device are able to be forwarded from the first target edge device to the second target edge device through the network comprises:
  determining an internet protocol (IP) address based on the information of the first network address;
  determining, based on the IP address and the forwarding information of the plurality of network devices, an edge device through which a packet that uses the IP address as a destination IP address is forwarded outside of the network after entering the network through the first target edge device; and
  analyzing whether the determined edge device through which the packet is forwarded outside of the network is the second target edge device.

16. The non-transitory storage medium according to claim 13, wherein the computer program or instructions, when executed by the computer, further cause the computer to carry out:
  in response to estimating, based on the information of the first network address and the forwarding information of the plurality of network devices, that the one or more packets whose destination addresses are covered by the information of the first network address and that enter the network through the first target edge device are able to be forwarded from the first target edge device to the second target edge device through the network, determining that the second target edge device is reachable to the first target edge device; or
  in response to estimating, based on the information of the first network address and the forwarding information of the plurality of network devices, that the one or more packets whose destination addresses are covered by the information of the first network address and that enter the network through the first target edge device cannot be forwarded from the first target edge device to the second target edge device through the network, determining that the second target edge device is unreachable to the first target edge device.

17. The non-transitory storage medium according to claim 13, wherein the computer program or instructions, when executed by the computer, further cause the computer to carry out:
  when reachability is implemented between all edge devices in the network, determining that the network is reachable; or
  when reachability is not implemented between at least one pair of edge devices in the network, determining that the network is unreachable.

18. The method according to claim 1, wherein the reachability analysis is performed only for edge devices of the network.

19. The method according to claim 1, wherein first target edge device and the second target edge device are edge devices of a same network.

* * * * *